US012558927B2

(12) United States Patent
Sugimoto et al.

(10) Patent No.: US 12,558,927 B2
(45) Date of Patent: Feb. 24, 2026

(54) ELASTIC AND POWER GENERATION BODY ASSEMBLY FOR A TIRE

(71) Applicants: Sumitomo Rubber Industries, Ltd., Kobe (JP); The School Corporation Kansai University, Suita (JP)

(72) Inventors: Mutsuki Sugimoto, Kobe (JP); Hiroshi Tani, Suita (JP); Kenichi Kuroda, Kobe (JP); Takahiro Fujiwara, Kobe (JP); Kyota Sugioka, Kobe (JP)

(73) Assignees: SUMITOMO RUBBER INDUSTRIES, LTD., Kobe (JP); THE SCHOOL CORPORATION KANSAI UNIVERSITY, Suita (JP)

( * ) Notice: Subject to any disclaimer, the term of this patent is extended or adjusted under 35 U.S.C. 154(b) by 264 days.

(21) Appl. No.: 18/276,658

(22) PCT Filed: Oct. 6, 2021

(86) PCT No.: PCT/JP2021/037070
§ 371 (c)(1),
(2) Date: Aug. 10, 2023

(87) PCT Pub. No.: WO2022/180916
PCT Pub. Date: Sep. 1, 2022

(65) Prior Publication Data

US 2024/0123776 A1 Apr. 18, 2024

(30) Foreign Application Priority Data

Feb. 26, 2021 (JP) ................................ 2021-029786

(51) Int. Cl.
*B60C 23/06* (2006.01)
*B60C 9/02* (2006.01)
(Continued)

(52) U.S. Cl.
CPC .......... *B60C 23/064* (2013.01); *B60C 9/0238* (2013.01); *B60C 23/0467* (2013.01); *B60C 9/0042* (2013.01); *B60C 23/002* (2013.01)

(58) Field of Classification Search
CPC ............ B60C 23/0408; B60C 23/0496; B60C 23/061; B60C 23/0494; B60C 23/0416;
(Continued)

(56) References Cited

U.S. PATENT DOCUMENTS 4,007,769 A * 2/1977 Powell .................... B60C 15/02 152/454
11,437,932 B2 * 9/2022 Sugimoto ................ H02N 1/08
(Continued)

FOREIGN PATENT DOCUMENTS

CN 110733299 A * 1/2020 ......... B60C 23/0411
EP 3597455 A1 * 1/2020 ........... B60C 23/041
(Continued)

OTHER PUBLICATIONS

International Search Report and Written Opinion mailed on Dec. 7, 2021, received for PCT Application PCT/JP2021/037070, filed on Oct. 6, 2021, 10 pages including English Translation.
(Continued)

*Primary Examiner* — Andre J Allen
(74) *Attorney, Agent, or Firm* — XSENSUS LLP

(57) ABSTRACT

A tire assembly includes a tire for mounting on a vehicle, an elastic body disposed on an inner side of the tire, and a power generation body disposed between an inner surface of
(Continued)

the tire and the elastic body. The power generation body includes a first member and a second member. The first member has a first insulating film forming a first surface. The second member has a second insulating film forming a second surface that faces the first surface and contacts the first surface. The elastic body biases the power generation body toward the inner surface of the tire.

12 Claims, 36 Drawing Sheets

(51) Int. Cl.
*B60C 23/04* (2006.01)
*B60C 9/00* (2006.01)
*B60C 23/00* (2006.01)

(58) Field of Classification Search
CPC . B60C 23/0433; B60C 23/0493; B60C 19/00; B60C 23/04; B60C 23/0462; B60C 23/041; B60C 23/20; B60C 23/0411; B60C 23/0479; B60C 23/0444; B60C 11/246; B60C 23/064; B60C 23/0488; B60C 11/24; B60C 23/007; B60C 23/062; B60C 23/0401; B60C 23/0413; B60C 23/06; B60C 23/043; B60C 23/02; B60C 23/0452; B60C 23/0498; B60C 23/0467; B60C 99/006; B60C 2019/004; B60C 23/0428; B60C 23/0442; B60C 11/243; B60C 23/009; B60C 23/0425; B60C 23/00354; B60C 23/004; B60C 23/045; B60C 23/0464; B60C 23/04985; B60C 23/00318; B60C 23/00; B60C 23/003; B60C 23/00372; B60C 23/0403; B60C 23/0406; B60C 23/0472; B60C 23/066; B60C 29/02; B60C 23/006; B60C 11/00; B60C 23/0454; B60C 23/044; B60C 23/0455; B60C 25/002; B60C 23/008; B60C 23/0483; B60C 23/0461; B60C 23/0474; B60C 23/0489; B60C 23/0415; B60C 23/0491; B60C 29/064; B60C 23/00363; B60C 23/0471; B60C 23/0459; B60C 23/0481; B60C 23/0476; B60C 11/0318; B60C 23/0477; B60C 2200/02; B60C 23/002; B60C 23/0437; B60C 2019/005; B60C 23/0405; B60C 23/042; B60C 23/0422; B60C 23/0423; B60C 23/0466; B60C 13/001; B60C 29/06; B60C 25/132; B60C 23/0427; B60C 23/0447; B60C 23/0449; B60C 9/18; B60C 25/00; B60C 23/065; B60C 23/0484; B60C 23/0486; B60C 19/003; B60C 23/00336; B60C 13/00; B60C 23/00345; B60C 23/08; B60C 17/00; B60C 2019/006; B60C 23/001; B60C 25/142; B60C 5/004; B60C 17/02; B60C 23/0445; B60C 23/0457; B60C 29/00; B60C 11/0083; B60C 25/145; B60C 9/02; B60C 11/0332; B60C 25/18; B60C 29/066; B60C 11/13; B60C 23/0418; B60C 23/0469; B60C 23/068; B60C 23/12; B60C 99/00; B60C 23/0432; B60C 25/138; B60C 5/14; B60C 11/03; B60C 23/005; B60C 25/005; B60C 25/007; B60C 25/0554; B60C 3/00; B60C 11/11; B60C 17/04; B60C 17/06; B60C 23/0435; B60C 23/063; B60C 23/10; B60C 25/14; B60C 29/005; B60C 29/062; B60C 99/003; B60C 11/032; B60C 11/12; B60C 13/003; B60C 15/06; B60C 19/001; B60C 23/126; B60C 23/127; B60C 23/16; B60C 29/068; B60C 3/04; B60C 9/20; B60C 11/01; B60C 11/0302; B60C 13/02; B60C 25/056; B60C 29/04; B60C 5/142; B60C 1/0016; B60C 11/0304; B60C 11/0306; B60C 19/08; B60C 2009/2038; B60C 2011/0374; B60C 2011/0388; B60C 2011/1213; B60C 2011/1231; B60C 2011/1245; B60C 2200/065; B60C 23/00305; B60C 23/067; B60C 23/131; B60C 23/135; B60C 23/137; B60C 23/18; B60C 25/02; B60C 11/02; B60C 17/0009; B60C 19/002; B60C 19/12; B60C 2019/007; B60C 2200/04; B60C 2200/06; B60C 23/00347; B60C 25/05; B60C 5/001; B60C 5/22; B60C 1/0008; B60C 11/0058; B60C 11/0311; B60C 11/033; B60C 11/1218; B60C 11/124; B60C 11/1384; B60C 13/04; B60C 15/0036; B60C 15/024; B60C 17/041; B60C 17/066; B60C 2007/005; B60C 2009/0071; B60C 2009/2022; B60C 2009/2025; B60C 2011/0358; B60C 2011/1254; B60C 2017/068; B60C 2200/12; B60C 2200/14; B60C 23/121; B60C 23/123; B60C 23/133; B60C 25/0503; B60C 25/0515; B60C 25/0521; B60C 25/0551; B60C 25/15; B60C 25/16; B60C 29/007; B60C 3/06; B60C 5/002; B60C 5/02; B60C 5/20; B60C 7/00; B60C 7/12; B60C 9/005; B60C 9/1807; B60C 9/28; B60C 11/0041; B60C 11/04; B60C 2009/0276; B60C 2011/0033; B60C 2011/0346; B60C 2015/0617; B60C 2015/0678; B60C 2015/0682; B60C 2200/00; B60C 23/085; B60C 25/0548; B60C 25/185; B60C 7/105; B60C 7/107; B60C 9/22; G01M 17/02; G01M 17/022; G01M 17/027; G01M 17/021; G01M 17/024; G01M 17/025; G01M 17/013; G01M 17/007; G01M 1/045; G01M 17/06; G01M 1/326; G01M 1/02; G01M 1/30; G01M 17/0074; G01M 5/0058; G01M 1/26; G01M 17/04; G01M 1/225; G01M 17/065; G01M 17/0072; G01M 17/10; G01M 7/00; G01M 1/16; G01M 99/00; G01M 1/34; G01M 7/08; G01M 17/028; G01M 17/045; G01M 3/3218; G01M 3/40; G01M 1/04; G01M 17/08; G01M 17/03; G01M 5/0091; G01M 1/365; G01M 13/04; G01M 5/0066; G01M 1/08; G01M 1/22; G01M 13/027; G01M 17/00; G01M 5/0033; G01M 1/00; G01M 15/044; G01M 3/24; G01M 3/2876; G01M 5/0075; G01M 1/06; G01M 1/12; G01M 1/122; G01M 1/24; G01M 1/32; G01M 1/36; G01M 11/081; G01M 13/023; G01M 13/025; G01M 17/0076; G01M 3/022; G01M 3/042; G01M 3/045; G01M 3/147; G01M 3/227; G01M 3/3236; G01M 5/0016;

G01M 5/0025; G01M 5/0083; G01M 7/022; G01M 7/025; G01M 7/04; G01M 7/06; G01M 9/02; G01M 9/04; G01M 99/002; G01M 99/004; G01M 1/14; G01M 1/28; G01M 3/002; G01M 3/04; G01M 7/02; G01M 9/06

USPC .................................................. 73/146–146.8

See application file for complete search history.

(56) References Cited

U.S. PATENT DOCUMENTS

| | | | | |
|---|---|---|---|---|
| 2003/0201883 | A1 | 10/2003 | Saheki et al. | |
| 2006/0220816 | A1 | 10/2006 | Scheungraber et al. | |
| 2017/0148973 | A1 * | 5/2017 | Imai | H10N 30/88 |
| 2020/0023693 | A1 | 1/2020 | Ochi et al. | |
| 2021/0257931 | A1 * | 8/2021 | Sugimoto | B60C 23/041 |
| 2024/0308278 | A1 * | 9/2024 | Tsuji | B60W 40/12 |

FOREIGN PATENT DOCUMENTS

| | | | | | |
|---|---|---|---|---|---|
| JP | 2003-507230 | A | | 2/2003 | |
| JP | 2003-312221 | A | | 11/2003 | |
| JP | 2017-001556 | A | | 1/2017 | |
| JP | 2017-156258 | A | | 9/2017 | |
| JP | 2018191454 | A | * | 11/2018 | H02N 1/04 |
| JP | 2020-200012 | A | | 12/2020 | |
| KR | 10-1326584 | B1 | | 11/2013 | |
| WO | 01/12452 | A1 | | 2/2001 | |

OTHER PUBLICATIONS

Extended European search report issued on Nov. 12, 2024, in corresponding European patent Application No. 21928011.2, 7 pages.

Office Action issued on Dec. 24, 2024, in corresponding Japanese patent Application No. 2023-502056, 8 pages.

* cited by examiner

7

ELASTIC AND POWER GENERATION BODY ASSEMBLY FOR A TIRE

CROSS-REFERENCE TO RELATED APPLICATIONS

This application is based on PCT filing PCT/JP2021/037070, filed on Oct. 6, 2021, which claims priority from Japanese Patent Application No. 2021-029786, filed Feb. 26, 2021, the entire contents of each are incorporated herein by reference.

TECHNICAL FIELD

The present invention relates to a tire assembly that incorporates a power generation body inside a tire.

BACKGROUND ART

JP 2020-200012A (Patent Literature 1) discloses a tire assembly having a built-in contact-charging power generation body. The power generation body of Patent Literature 1 has a positively charged insulating film and a negatively charged insulating film, and generates power by changing the true contact area of the contact surfaces of these insulating films. In the tire assembly of Patent Literature 1, a higher power generation output can be obtained when the tire is traveling, by making the length of the contact surfaces in the tire circumferential direction not greater than the ground contact length of the tire.

CITATION LIST

Patent Literature

Patent Literature 1: JP 2020-200012A

SUMMARY OF INVENTION

Technical Problem

According to Patent Literature 1, when the length of the contact surfaces of the power generation body exceeds the ground contact length of the tire, there simultaneously exists a portion of the power generation body that approaches closest to the road surface and a portion that starts moving away from the road surface that was approached closest. A smaller overall voltage output is thought to result, due to the local electromotive forces generated in these portions cancelling each other out. In this way, with a tire assembly in which a power generation body is incorporated in the tire, the power generation body needs to be able to efficiently utilize the motion of the tire to generate power. In order to further improve the power generation capacity of the tire assembly, further investigation of the configuration of the tire assembly is desired.

An object of the present invention is to provide a tire assembly that is able to efficiently generate power.

Solution to Problem

A tire assembly according to a first aspect of the present invention includes a tire for mounting on a vehicle, an elastic body disposed on an inner side of the tire, and a power generation body disposed between an inner surface of the tire and the elastic body. The power generation body includes a first member and a second member. The first member has a first insulating film forming a first surface. The second member has a second insulating film forming a second surface facing the first surface and contacting the first surface. The first member and the second member are configured such that a true contact area between the first surface and the second surface changes in response to pressure applied to the first member and the second member. The first insulating film and the second insulating film are configured such that one of the films is positively charged and the other of the films is negatively charged due to the true contact area changing. The elastic body biases the power generation body toward the inner surface of the tire.

With the tire assembly according to the first aspect, the elastic body biases the power generation body toward the inner surface of the tire. The impact of the road surface on the tire can thereby be efficiently utilized to promote charging of the power generation body.

A tire assembly according to a second aspect of the present invention is the tire assembly according to the first aspect, whereby the elastic body may be disposed to cover the power generation body in a circumferential direction of the tire.

With the tire assembly according to the second aspect, the elastic body applies a biasing force to the power generation body, including to end portions thereof along the circumferential direction of the tire, thus enabling power generation of the power generation body to be efficiently promoted.

A tire assembly according to a third aspect of the present invention is the tire assembly according to the first or second aspect, whereby the elastic body may be a cord member.

A tire assembly according to a fourth aspect of the present invention is the tire assembly according to any of the first to third aspects, whereby the elastic body may be a leaf spring.

A tire assembly according to a fifth aspect of the present invention is the tire assembly according to any of the first to fourth aspects, whereby a length of the elastic body along the circumferential direction of the tire may be not less than a ground contact length of the tire.

With the tire assembly according to the fifth aspect, when the elastic body approaches the road surface most closely, the elastic body straddles the whole ground contact patch of the tire in the circumferential direction, and is subjected to pressure from the road surface near both end portions of the ground contact patch. Since the elastic body thereby applies a force to the power generation body that is disposed between the elastic body and the inner surface of the tire, the change in the true contact area increases, and charging of the power generation body can be promoted.

Here, the "ground contact length" of the tire is the maximum value of the circumferential length of a region of the tire where a tread part contacts a flat surface, when the tire is placed on the flat surface in a stationary state such that the rotation axis of the tire is parallel to the flat surface, and a load corresponding to a predetermined mass is applied. Note that the tire is mounted on a wheel having a standard rim and filled to a predetermined tire pressure. The ground contact shape of the region where the tread part contacts the flat surface can be taken as the shape transferred to the flat surface by paint or the like applied to the circumferential surface of the tire, when the tire is placed on the flat surface as described above. In other words, the ground contact length can be taken as the length of a first side of a bounding rectangle of the ground contact shape. Note that the first side of the bounding rectangle extends perpendicular to the direction of the rotation axis of the tire on the above flat surface.

The "standard rim" is a rim specified for each class of tire in the standards to which the tire is engineered. If the tire is engineered to JATMA (Japan Automobile Tyre Manufacturers Association) standards, rims specified in the JATMA Yearbook are the "standard rim". Also, if the tire is engineered to ETRTO standards, rims specified in the ETRTO Standards Manual are the "standard rim".

The "predetermined tire pressure" is given as 200 kPa. Note that this tire pressure is the tire pressure to which the tire is filled and does not include the increase in tire pressure caused by using the tire. The "predetermined mass", in the case where the tire is engineered to JATMA standards, is the mass (kg) corresponding to the load capacity when the tire pressure is 200 kPa in load/pressure tables prescribed by JATMA. If the tire is engineered to ETRTO standards ("normal load" version), the "predetermined mass" is the mass (kg) corresponding to the load when the tire pressure is 200 kPa in load/pressure tables prescribed by ETRTO (normal). If the tire is engineered to ETRTO standards ("reinforced" version), the "predetermined mass" is the mass (kg) corresponding to the load when the tire pressure is 200 kPa in load/pressure tables prescribed by ETRTO (reinforced).

A tire assembly according to a sixth aspect of the present invention is the tire assembly according to any of the first to fifth aspects, whereby a material constituting the elastic body may be selected from a group consisting of a metal, an elastomer, a resin, an elastomer foam, and a resin foam.

Here, "elastomer" collectively refers to a polymer having elasticity, and includes a thermosetting polymer and a thermoplastic polymer. The thermosetting polymer is typically vulcanized rubber.

A tire assembly according to a seventh aspect of the present invention is the tire assembly according to any of the first to sixth aspects, whereby the power generation body may be configured such that a length of the first surface along the circumferential direction of the tire is not greater than the ground contact length of the tire.

With the tire assembly according to the seventh aspect, the portion of the first surface that is charged does not straddle between both end portions of the ground contact patch of the tire, when the power generation body approaches the road surface most closely. Thus, the overall charged amount decreasing due to local electromotive forces generated in the power generation body cancelling each other out is prevented.

A tire assembly according to an eighth aspect of the present invention is the tire assembly according to any of the first to seventh aspects, whereby the power generation body may be configured such that at least one of the first surface and the second surface has undulations.

With the tire assembly according to the eighth aspect, the true contact area changes due to deformation of at least one of the first surface and the second surface, contributing to charging. The configuration of the power generation body can thereby be simplified.

A tire assembly according to a ninth aspect of the present invention is the tire assembly according to any of the first to eighth aspects, whereby the first member may further have a first electrode disposed on a back surface of the first surface so as to contact the first insulating film, the second member may further have a second electrode disposed on a back surface of the second surface so as to contact the second insulating film, and the first electrode and the second electrode may be constituted by a material having flexibility.

A tire assembly according to a tenth aspect of the present invention is the tire assembly according to any of the first to ninth aspects, whereby the tire assembly may further include an electronic device configured to receive supply of power output from the power generation body.

A tire assembly according to an eleventh aspect of the present invention is the tire assembly according to the tenth aspect, whereby the tire assembly may further include a storage battery configured to store power output by the power generation body, and the electronic device may receive supply of power stored in the storage battery.

A tire assembly according to a twelfth aspect of the present invention is the tire assembly according to the tenth or eleventh aspect, whereby the electronic device may include a communication device capable of data communication with an external device.

A tire monitoring system according to a thirteenth aspect of the present invention includes the tire assembly according to the twelfth aspect, and an external control device capable of data communication with the communication device. The communication device transmits output data of at least one of a voltage and current output by the power generation body and a physical quantity based on at least one of the voltage and current to the external control device, and the external control device monitors information relating to the tire, based on the output data received from the communication device.

A tire monitoring system according to a fourteenth aspect of the present invention is the tire monitoring system according to the thirteenth aspect, whereby the information relating to the tire may include at least one of information relating to a rotation speed of the tire, information relating to wear of the tire, and information relating to a state of a road surface on which a vehicle on which the tire is mounted travels.

A tire monitoring system according to a fifteenth aspect of the present invention is the tire monitoring system according to the thirteenth or fourteenth aspect, whereby the external control device may be installed in a vehicle that includes the tire assembly.

A tire monitoring method according to a sixteenth aspect of the present invention includes the following:

preparing a vehicle on which the tire assembly according to any one of the tenth to twelfth aspects is mounted;

collecting output data of at least one a voltage and current output by the power generation body while the vehicle is travelling and a physical quantity based on at least one of the voltage and current; and monitoring information relating to the tire, based on the collected output data.

Advantageous Effects of Invention

According to the present invention, a tire assembly that is able to efficiently generate power is provided.

DESCRIPTION OF EMBODIMENTS

Hereinafter, a tire assembly according to one embodiment of the present invention, and a tire monitoring system and monitoring method that utilize this tire assembly will be described, with reference to the drawings.

1. Overall Configuration of Monitoring System

Figure 1:
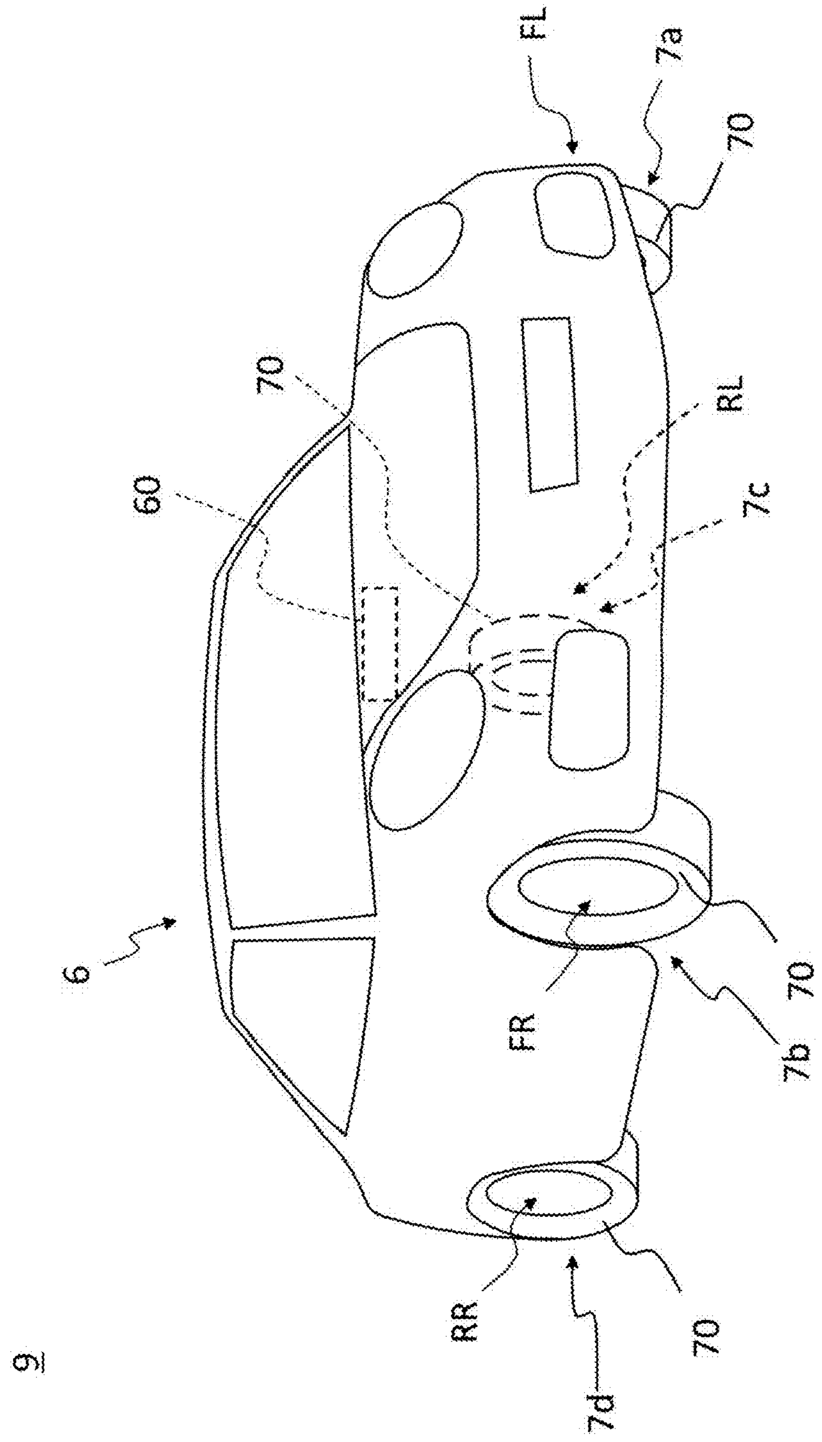
FIG. 1 is a diagram showing an overall configuration of a monitoring system according to one embodiment.

FIG. 1 shows an overall configuration of a tire monitoring system 9 (hereinafter, also simply referred to as "system 9") that utilizes a tire assembly 7 according to one embodiment of the present invention. The system 9 according to the present embodiment includes tire assemblies 7*a* to 7*d* and a control device 60 that is installed in a vehicle 6 on which the tire assemblies 7*a* to 7*d* are mounted. The type of vehicle 6 is not particularly limited and, in the present embodiment, is a four-wheeled vehicle, and includes a left front wheel FL, a right front wheel FR, a left rear wheel RL, and a right rear wheel RR. The tire assemblies 7*a* to 7*d* are respectively mounted on the wheels FL, FR, RL and RR of the vehicle 6. The tire assemblies 7*a* to 7*d* are attached to different wheels but have the same structure and function. Accordingly, hereinafter, the tire assemblies 7*a* to 7*d* may be referred to as the tire assembly 7, without distinguishing therebetween.

As will be described later, the tire assembly 7 is configured to generate power utilizing vibration transmitted from the road surface, when rotating on the road surface as the vehicle 6 travels. The power generated by the tire assembly 7 is supplied to electronic devices provided in the tire assembly 7. Also, the tire assembly 7 includes an electronic device capable of communicating with the control device 60 that is installed in the vehicle 6, and is configured to transmit time series data representing the amount of power generated thereby. The control device 60 is able to monitor the state of the tire assembly 7 which includes a tire 70, based on the time series data received from the tire assembly 7.

2. Configuration of Tire Assembly

Figure 2:
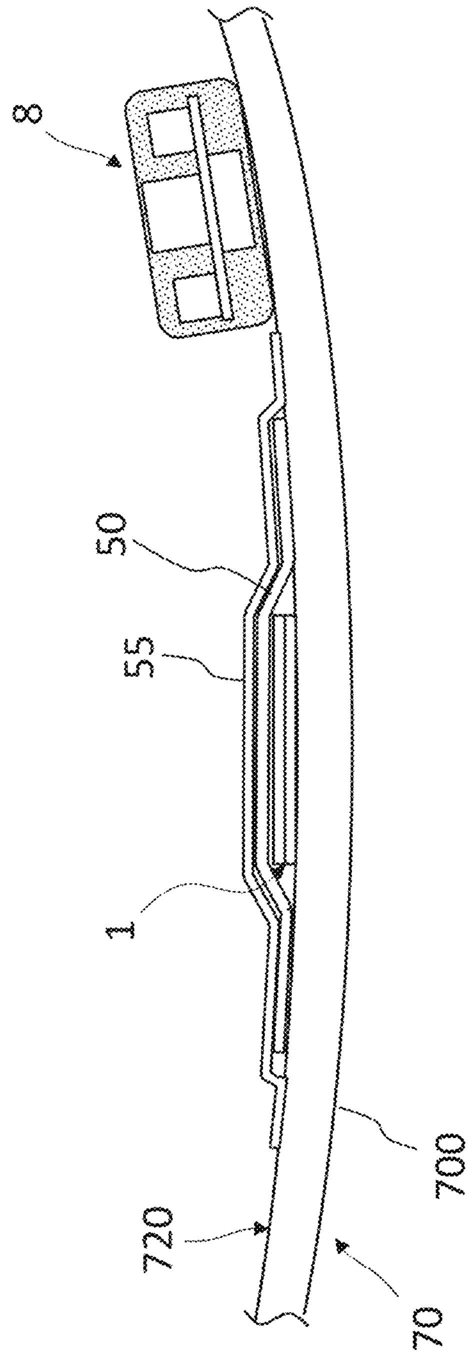
FIG. 2 is a partial cross-sectional view of a tire assembly according to one embodiment.
Figure 3:
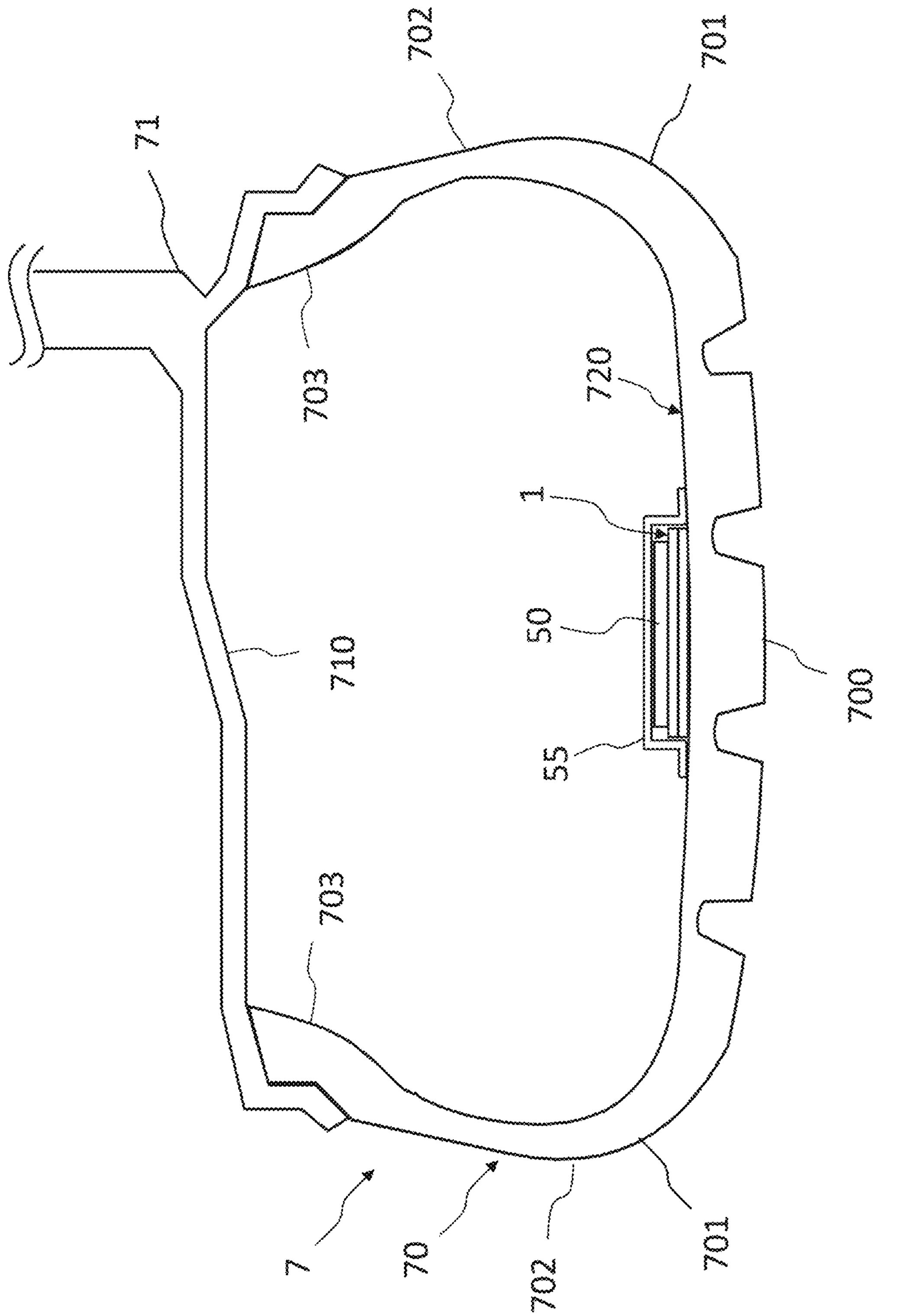
FIG. 3 is a partial cross-sectional view of the tire assembly according to one embodiment.

Hereinafter, the configuration of the tire assembly 7 will be described with reference to the drawings. FIGS. 2 and 3 are schematic partial cross-sectional views of the tire assembly 7. FIG. 2 shows a cross-section in which the tire assembly 7 is sectioned in a plane that passes through the center of a tread part 700 of the tire assembly 7 and is perpendicular to the rotation axis of the tire assembly 7, and FIG. 3 shows a cross-section in which the tire assembly 7 is sectioned in a plane that includes the rotation axis of the tire assembly 7. In FIG. 2, the direction from far to near in the diagram and the direction from near to far in the diagram are parallel to the rotation axis of the tire assembly 7. Note that the dimensions of the various elements in the diagrams may be shown in an exaggerated manner for convenience of description, and do not necessarily represent the actual dimensions or size relationships.

As shown in FIG. 2, the tire assembly 7 includes the tire 70, a power generation body 1, an elastic body 50, and an electronic device module 8 (hereinafter, also simply referred to as "module 8"). The power generation body 1 and the elastic body 50 are disposed on an inner surface 720 of the tire 70, are covered entirely by a sheet 55 and fixed on the inner surface 720 together with the sheet 55. The module 8 is fixed on the inner surface 720, so as to be aligned along the circumference direction of the tire 70 with the power generation body 1 and the elastic body 50 that are covered by the sheet 55. The module 8 is electrically connected to the power generation body 1 by lead wires 85 and 85 described later. The power generation body 1, the elastic body 50, the sheet 55 and the module 8 will be described later.

The tire 70 is constituted by vulcanized rubber or the like, and has elasticity. As shown in FIG. 3, the tire 70 has the tread part 700, shoulder parts 701, sidewall parts 702, and bead parts 703. The tread part 700 is a portion demarcating the side peripheral surface of the tire assembly 7, and moves the vehicle 6 forward by contacting the road surface and generating friction. The shoulder parts 701 are portions adjacent to the tread part 700 and the sidewall parts 702. The sidewall parts 702 bend and deflect to absorb the impact from the road surface. The bead parts 703 incorporate a bead wire not shown, and are fixed to a wheel rim 710 that is formed on a peripheral portion of a wheel 71.

The following is a detailed description of the configuration of the power generation body 1, the elastic body 50, the sheet 55 and the module 8, operations of the tire assembly 7, and the tire monitoring system and monitoring method.

2-1. Power Generation Body

Figure 4:
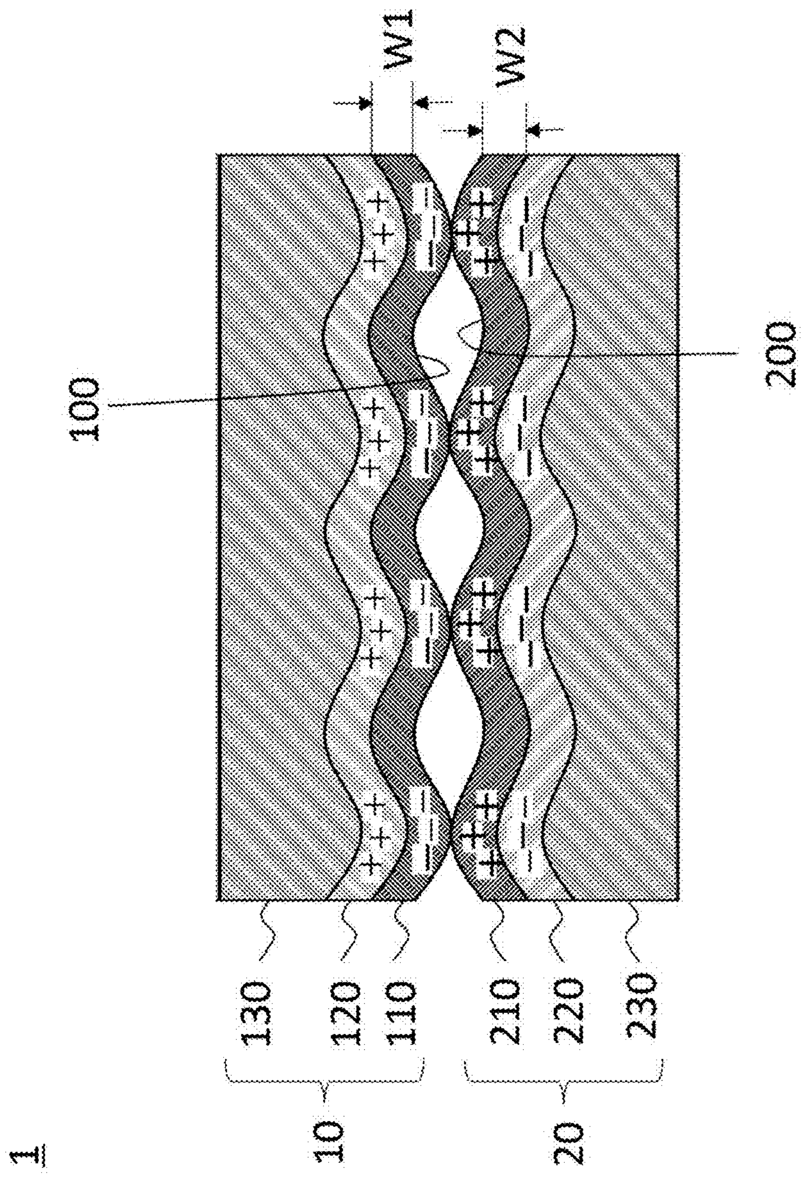
FIG. 4 is a cross-sectional view of a power generation body according to one embodiment.

FIG. 4 is a cross-sectional view showing the configuration of the power generation body 1 according to the present embodiment. As shown in FIG. 4, the power generation body 1 includes a first member 10 and a second member 20, and is constituted with the members layered in this order. The power generation body 1 of the present embodiment has a square shape in plan view with the length of each side being L0 (see FIG. 7A), but the shape of the power generation body 1 is not limited thereto. Note that the direction of the power generation body 1 when in use is not limited to the direction shown in FIG. 4.

First Member

The first member 10 has a first base 130, a first electrode 120, and a first insulating film 110. These elements of the first member 10 each have a square shape in plan view with the length of each side being L0, and are layered in this order from the outer side to the inner side of the power generation body 1. The first base 130 is constituted by a material having flexibility or a material having viscoelasticity, such as a resin or an elastomer, for example, so as to be deformable by an external force. The first base 130 of the present embodiment is constituted by silicone rubber. A large number of undulations are formed on the surface of the first base 130 that is on the side contacting the first electrode 120. Undulations corresponding to the undulations of the first base 130 are thereby reproduced on a first surface 100 that is formed by the first insulating film 110 via the first electrode 120.

The configuration of the undulations of the first base 130 is not particularly limited. For example, the undulations may be regularly formed over the surface direction of the first base 130, or may be randomly formed to a certain extent. The cross-sectional shape of the undulations is also not particularly limited.

The first electrode 120 is a portion for removing electric charge generated in the first insulating film 110 to outside the power generation body 1, and is disposed on the back surface of the first surface 100 so as to contact the first insulating film 110. The first electrode 120 can be constituted by a material having conductivity, examples of such a material including a conductive film made of Ag, Cu or the like and a conductive fabric. The composition of the conductive fabric is not particularly limited, and may be obtained by metal-plating an organic fiber fabric constituted by a polymer material, or by mixing metal fibers with fibers constituted by a polymer material. The first electrode 120 has flexibility and can be deformed in a manner that follows the deformation of the first base 130. Also, undulations corresponding to the undulations of the first base 130 are reproduced on the surface of the first electrode 120 that contacts the first insulating film 110.

The first insulating film 110 is a film constituted by an insulator and has flexibility. In the present embodiment, the surface of the first insulating film 110 on the opposite side to the first electrode 120 corresponds to the first surface 100. Undulations corresponding to the undulations of the first base 130 are formed on the first surface 100 by the first base 130. The first surface 100 faces the second surface 200 that is formed by the second insulating film 210 described later and contacts the second surface 200. The first insulating film 110 is charged to the opposite polarity to the second insulating film 210 when the true contact area, which is the actual contact area between the first surface 100 and the second surface 200, changes due to the pressure that is applied to the power generation body 1. That is, when the second insulating film 210 is positively charged, the first insulating film 110 is negatively charged. Also, when the second insulating film 210 is negatively charged, the first insulating film 110 is positively charged.

The ten-point mean roughness of the first surface 100 is preferably from 100 μm to 2 mm inclusive. Note that the method of measuring the ten-point mean roughness is compliant with JIS B 0601:2001.

Note that when the first surface 100 and the second surface 200 are described as "contacting" each other, the first surface 100 and the second surface 200 may partially contact, or there may be portions of the first surface 100 and the second surface 200 that do not come in contact with each other. The power generation body 1 of the present embodiment is constituted such that the first surface 100 and the second surface 200 both have a square shape with side lengths of L0 and entirely overlap each other. In other words, in the power generation body 1 of the present embodiment, one surface of the first insulating film 110 and one surface of the second insulating film 210 are substantially in contact with each other wholly.

Second Member

The second member 20 includes a second base 230, a second electrode 220, and a second insulating film 210. These elements of the second member 20 each have a square shape in plan view with a length of each side being L0, and are layered in this order from the outer side to the inner side of the power generation body 1. The second base 230 is, similarly to the first base 130, constituted by a material having flexibility or a material having viscoelasticity, such as a resin or an elastomer, for example, so as to be deformable by an external force. The second base 230 of the present embodiment is constituted by silicone rubber. A large number of undulations are formed on the surface of the second base 230 that is on the side contacting the second electrode 220. Undulations corresponding to the undulations of the second base 230 are thereby reproduced on a second surface 200 formed by the second insulating film 210 via the second electrode 220.

The configuration of the undulations of the second base 230 is not particularly limited. For example, the undulations may be regularly formed over the surface direction of the second base 230, or may be randomly formed to a certain extent. The cross-sectional shape of the undulations is also not particularly limited.

The second electrode 220 is a portion for removing electric charge generated in the second insulating film 210 to outside the power generation body 1, and is disposed on the back surface of the second surface 200 so as to contact the second insulating film 210. The second electrode 220 can be constituted by a material having conductivity, examples of such a material including a conductive film made of Ag, Cu or the like, and a conductive fabric. The composition of the conductive fabric is not particularly limited, and may be obtained by metal-plating an organic fiber fabric constituted by a polymer material, or by mixing metal fibers with fibers constituted by a polymer material. The second electrode 220 has flexibility and can be deformed in a manner that follows the deformation of the second base 230. Also, undulations corresponding to the undulations of the second base 230 are reproduced on the surface of the second electrode 220 that contacts the second insulating film 210.

The second insulating film 210 is a film constituted by a different insulator from the first insulating film 110 and has flexibility. In the present embodiment, the surface of the second insulating film 210 on the opposite side to the second electrode 220 corresponds to the second surface 200. Undulations corresponding to the undulations of the second base 230 are formed on the second surface 200 by the second base 230. The second surface 200 faces the first surface 100 that is formed by the first insulating film 110 and contacts the first surface 100. The second insulating film 210 is charged to the opposite polarity to the first insulating film 110 when the true contact area between the first surface 100 and the second surface 200 changes due to the pressure applied to the power generation body 1. That is, when the first insulating film 110 is positively charged, the second insulating film 210 is negatively charged. Also, when the first insulating film 110 is negatively charged, the second insulating film 210 is positively charged.

The ten-point mean roughness of the second surface 200 is preferably from 100 μm to 2 mm inclusive. Note that the method of measuring the ten-point mean roughness is compliant with JIS B 0601:2001.

Materials

The materials constituting the first insulating film 110 and the second insulating film 210 can be selected from a group consisting of, for example, diamond-like carbon (DLC), perfluoropolyether, polymethyl methacrylate, nylon, polyvinyl alcohol, polyester, polyisobutylene, polyurethane (PU), polyethylene terephthalate, polyvinyl butyral, polychloroprene, natural rubber, polyacrylonitrile, polydiphenyl carbonate, chlorinated polyether, polyvinylidene chloride, polystyrene, polyethylene, polypropylene, polyimide, polyvinyl chloride, polydimethylsiloxane, polytetrafluoroethylene, a copolymer of ethylene tetrafluoride and propylene hexafluoride, a copolymer of tetrafluoroethylene and hexafluoropropylene (FEP), or a material whose main component is a fluorocarbon organic compound.

From the viewpoint of wear caused by frictional contact being low, DLC which has high hardness and a low friction coefficient or a material whose main component is a fluorocarbon organic compound which has high lubricity is preferably selected from the above group. Also, from the viewpoint of increasing the electromotive force of the power generation body 1, a pair of materials that are far apart in the triboelectric series are preferably selected from the above group. Note that a configuration may be adopted in which one of the first insulating film 110 and the second insulating film 210 is positively charged and the other is negatively charged.

In the present embodiment, the first insulating film 110 is constituted by polyimide, and the second insulating film 210 is constituted by nylon. In the present embodiment, the first insulating film 110 is thereby a negatively-charged insulating film, and the second insulating film 210 is a positively-charged insulating film.

Dimensions

Preferably, at least one of a thickness W1 of the first insulating film 110 and a thickness W2 of the second insulating film 210 is not more than 20 μm. More preferably, both the thickness W1 and the thickness W2 are not more than 20 μm. Note that the diagrams do not necessarily reflect the actual dimensions of the elements of the power generation body 1.

Also, when the power generation body 1 is configured in a square shape, the length L0 of each side of the square is preferably from 50 mm to 100 mm inclusive. From the viewpoint of increasing the charged amount of the power generation body 1, it is conceivable to increase an area S0 of the first insulating film 110 and the second insulating film 210 as much as possible by increasing the length L0, and to bring the first surface 100 and the second surface 200 in contact with each other over a larger area. The inventors prepared four types of the power generation body 1 having different dimensions, namely, L0=25 mm (S0=625 $mm^2$), 50 mm (S0=2500 $mm^2$), 75 mm (S0=5625 $mm^2$) and 100 mm (S0=10000 $mm^2$), applied the same pressure to each of the power generation bodies using a dedicated testing device, and measured the output voltages. The testing device was configured to measure the output voltage of the power generation body 1, while repeatedly applying a given pressing force to the power generation body 1 throughout the surface direction of the first surface 100 and the second surface 200 and releasing the applied pressing force in a given cycle.

Figure 5A:
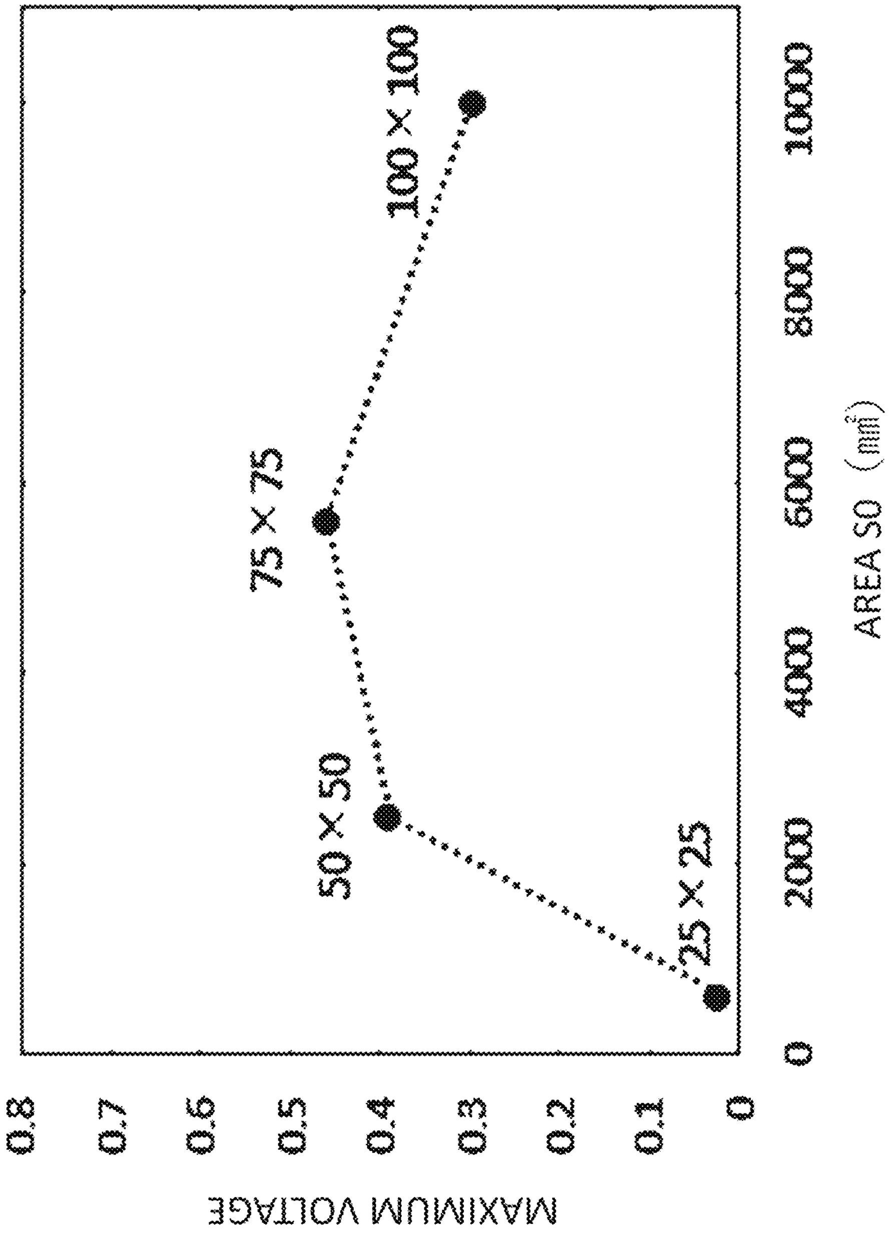
FIG. 5A is a graph showing the results of tests conducted by the inventors.

As a result, it was found that even if the area of the first surface 100 and the second surface 200 is increased, the voltage that is output by the power generation body 1 does not necessarily increase in proportion to the area. The test results are shown in the graph of FIG. 5A. The horizontal axis of the graph is area ($mm^2$) and the vertical axis is normalized maximum voltage. As shown in FIG. 5, the maximum voltage was at a maximum when L0=75 mm, and the maximum voltage was larger when L0=50 mm than when L0=100 mm. Such results are conceivably obtained because, when the area S0 increases to a certain extent, it becomes difficult to apply a uniform force throughout the surface direction of the first surface 100 and the second surface 200, causing uneven change in the true contact area and uneven charging of the first insulating film 110 and the second insulating film 210, and consequently local polarization of electric charge gets absorbed by other portions.

From these test results, it can be said that, in the case where the first surface 100 and the second surface 200 are constituted in a square shape, the length L0 of each side of the square is preferably from 50 mm to 100 mm inclusive. Note that while FIG. 5A shows results for when the first insulating film 110 is made of polyimide and the second insulating film 210 is made of nylon, it is assumed that the power generation body 1 will exhibit similar tendencies to FIG. 5, regardless of the materials of the first insulating film 110 and the second insulating film 210.

Figure 12:
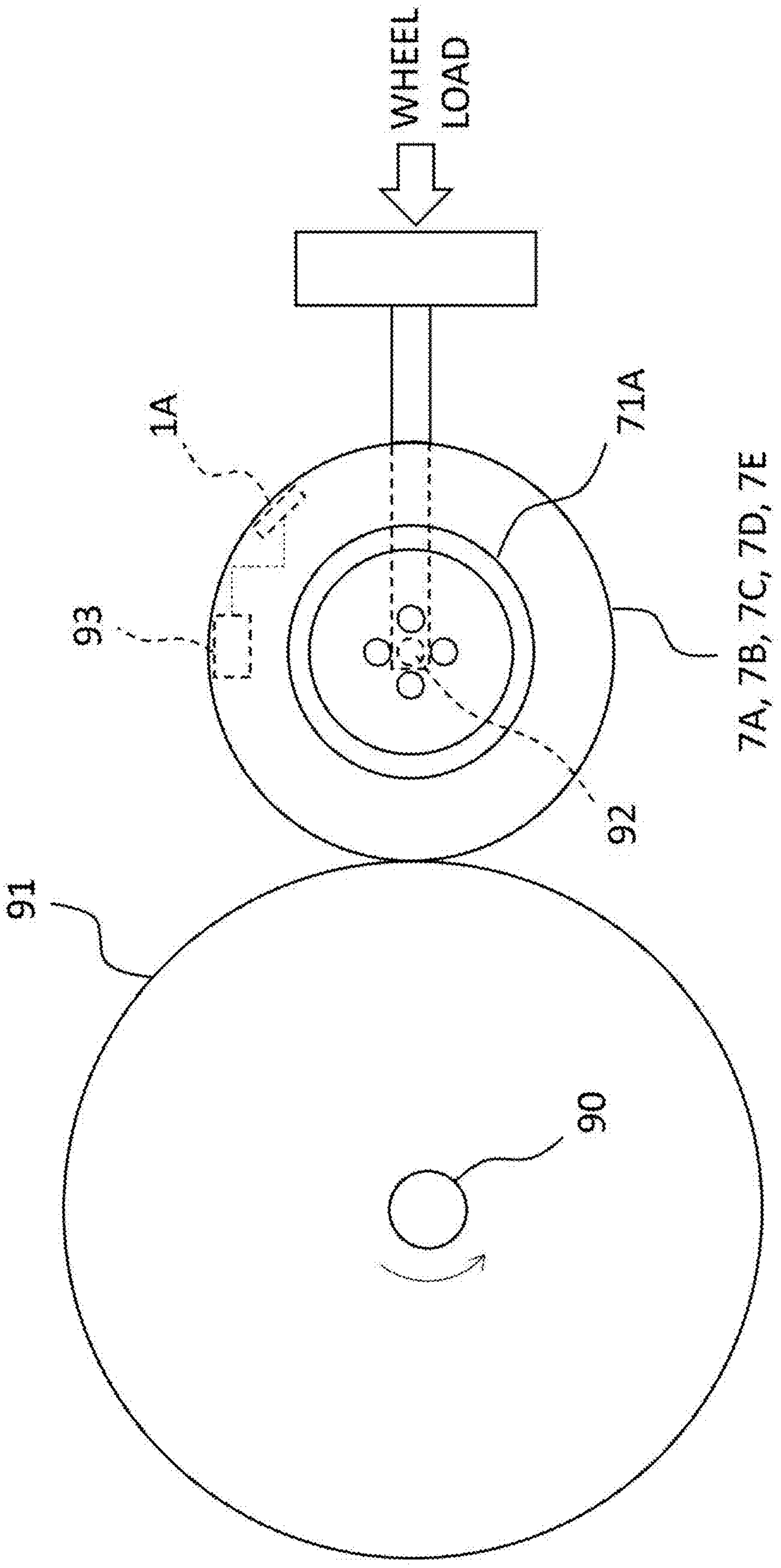
FIG. 12 is a diagram showing the configuration of a testing device.

Furthermore, the length L0 preferably satisfies $L0<(1.6\times L_c)$, and more preferably satisfies $L0<L_c$. Note that $L_c$ represents the ground contact length of the tire 70, which is defined as described above. This was confirmed by tests conducted by the inventors. The inventors prepared two types of the tire assembly 7 that differed only in the length L1 of the elastic body 50, respectively installed each type of the tire assembly 7 in a testing device such as shown in FIG. 12, and compared the maximum voltages of the power generation body 1 with respect to the ground contact length $L_c$. The testing device includes a drum 91 that rotates the tire assembly 7 mounted on a wheel 71A at a predetermined rotation speed, and a data logger 93 that is connected to the first electrode 120 and the second electrode 220 of the power generation body 1 and measures the voltage waveform. Also, the testing device is configured to be able to apply a predetermined wheel load to the tire assembly 7, and various ground contact lengths $L_c$ were simulated by changing the wheel load and the tire pressure within the tire assembly 7.

The length L0 of each side of the power generation body 1 was 50 mm. Also, two types of the elastic body 50 were constituted by polypropylene foam having a rectangular shape in plan view, with the two types both having a thickness of 2 mm and a length L2 of 50 mm, and respective lengths L1 of 100 mm and 150 mm. Note that, as will be described later, the length L1 is the length of the elastic body 50 along the circumferential direction of the tire 70, and the length L2 is the length of the elastic body 50 along the width direction of the tire 70. The power generation body 1 was disposed in the center of the elastic body 50.

Figure 5B:
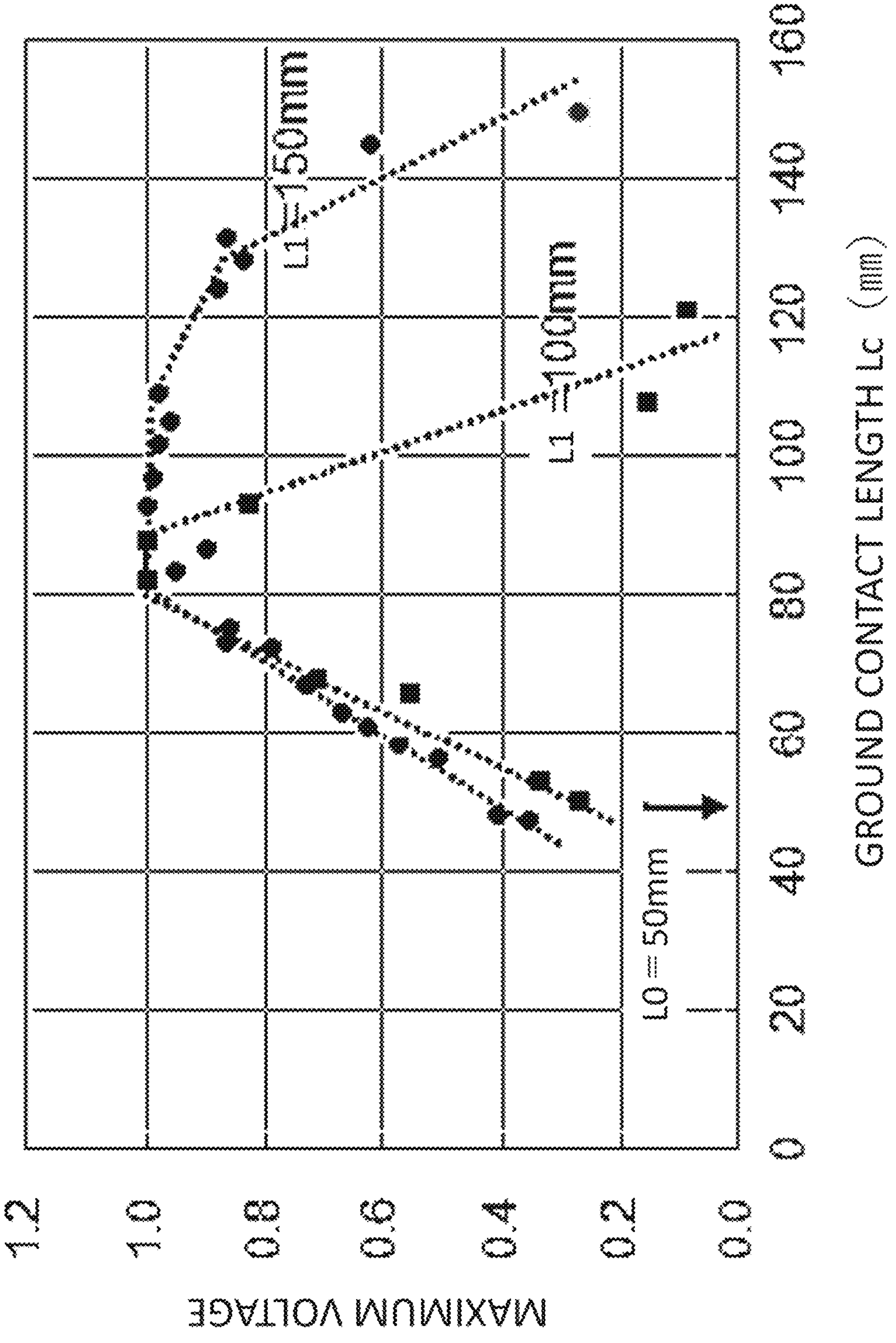
FIG. 5B is a graph showing the results of tests conducted by the inventors.

The test results are shown in the graph of FIG. 5B. The horizontal axis of the graph is ground contact length $L_c$ (mm), and the vertical axis is normalized maximum voltage. Also, the square plot points are data for the elastic body 50 having the length L1 of 100 mm, and the round plot points are data for the elastic body 50 having the length L1 of 150 mm. As can be seen from FIG. 5B, the maximum voltage increases as the ground contact length $L_c$ increases beyond the length L0, and peaks near a ground contact length $L_c$ of 80 mm, regardless of the length L1 of the elastic body 50. Also, it was found that the maximum voltage decreases markedly when the ground contact length $L_c$ exceeded the length L1, and the output voltage decrease as the ground contact length $L_c$ increases beyond the length L1.

Arrangement

The power generation body 1 may be disposed such that the first member 10 faces the inner surface 720 of the tire 70 and the second member 20 faces the elastic body 50 described later, or may be disposed such that the second member 20 faces the inner surface 720 of the tire 70 and the first member 10 faces the elastic body 50. Also, whichever of the first member 10 and the second member 20 of the power generation body 1 faces the inner surface 720 of the tire 70 is preferably fixed to the inner surface 720 with an adhesive, double-sided tape or the like, and whichever of the first member 10 and the second member 20 faces the elastic body 50 is preferably fixed to the elastic body 50 with an adhesive, double-sided tape or the like.

Charging Principle of Power Generation Body 1

The first insulating film 110 and the second insulating film 210 are charged by operating in the following manner. As shown in FIG. 4, both the first surface 100 and the second surface 200 of the present embodiment have undulations, and even when external pressure is not applied to the power generation body 1, these surfaces do not completely separate and remain partially in contact with each other. At this time, the distance between a mean surface of the first surface 100 and a mean surface of the second surface 200 (mean inter-surface interval) is comparatively large, and is equivalent to the true contact area between the first surface 100 and the second surface 200 being comparatively small.

Figure 6:
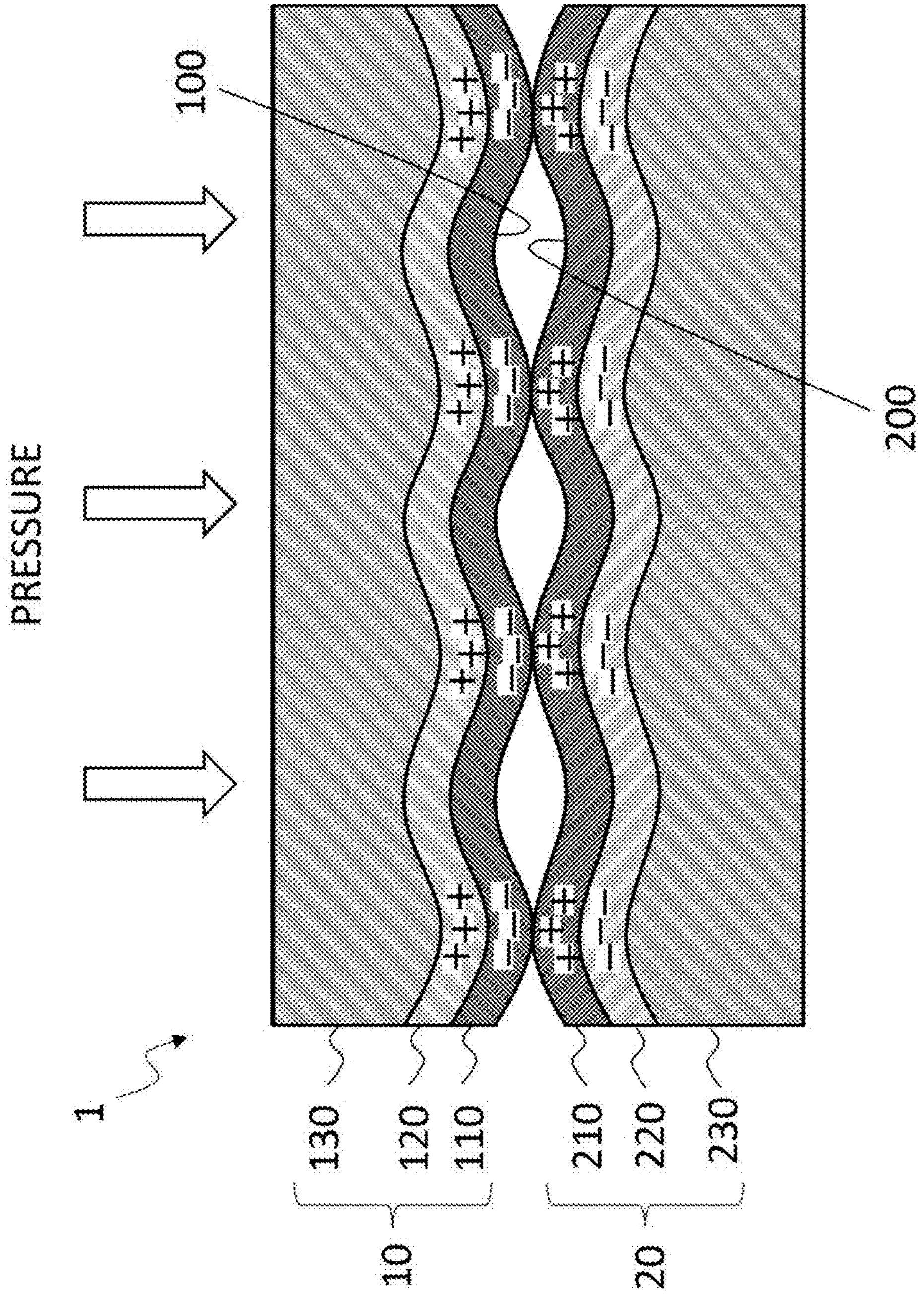
FIG. 6 is a diagram illustrating a charging principle of the power generation body.

Next, when pressure is applied to the power generation body 1 such that the first insulating film 110 and the second insulating film 210 move toward each other, the shapes of the first surface 100 and the second surface 200 change to become slightly flatter as shown in FIG. 6, and the mean inter-surface interval decreases. In other words, the true contact area increases. Furthermore, when the pressure applied to the power generation body device 1 is removed, the first insulating film 110 and the second insulating film 210 move away from each other again, and the mean inter-surface interval increases. In other words, the true contact area decreases. In this way, when the true contact area changes, the charged amount of the first insulating film 110 and the second insulating film 210 increases from an initial state, and more electric charge is induced in the first electrode 120 and the second electrode 220.

Note that, in a configuration where undulations are formed on at least one of the first surface 100 and the second surface 200, the true contact area also changes to a certain extent due to the first insulating film 110 and the second insulating film 210 moving relative to each other in the surface direction. Accordingly, out of the forces that are applied to the power generation body 1, not only forces that are applied in a direction that increases or decreases the mean inter-surface interval but also forces that cause the first insulating film 110 and the second insulating film 210 to slide relative to each other in the surface direction contribute to the power generation of the power generation body 1.

2-2. Sheet

Figure 7A:
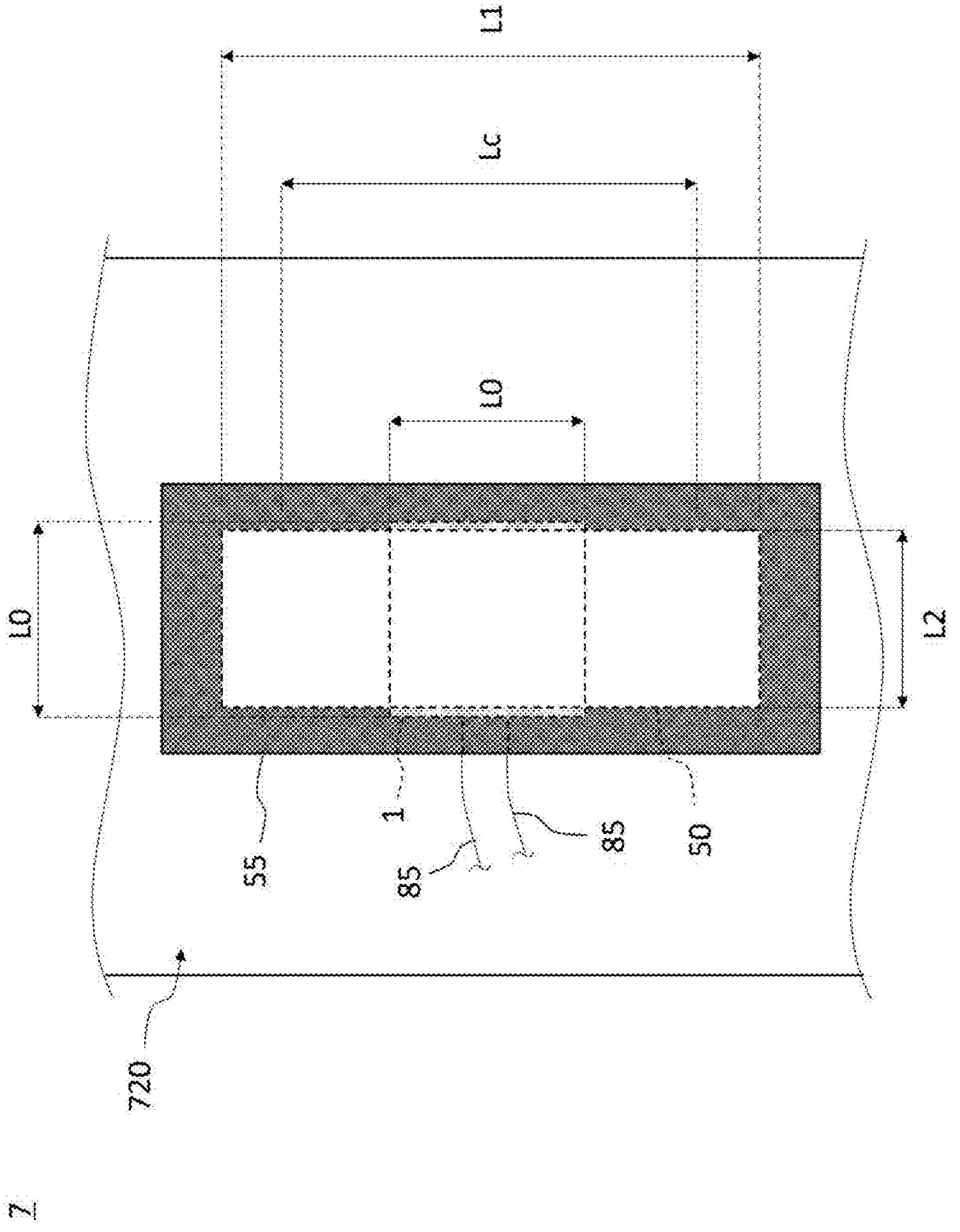
FIG. 7A is a development view showing the inside of the tire assembly.

FIG. 7A is a development view of the tire assembly 7 when the tire assembly 7 is opened out such that the inner surface 720 of the tire 70 faces upward. In FIG. 7A, only the substantially rectangular sheet 55 appears, and the power generation body 1 and the elastic body 50 that are covered by the sheet 55 and are not visible from the outside are indicated by dashed lines. The sheet 55 is a thin sheet-like member having flexibility, and a peripheral portion thereof is fixed to the inner surface 720 with an adhesive or the like, with the power generation body 1 and the elastic body 50 sandwiched between the sheet 55 and the inner surface 720. The power generation body 1 and the elastic body 50 are thereby fixed such that the power generation body 1 and the elastic body 50 do not move during rotation of the tire assembly 7. The sheet 55 may be fixed to the inner surface 720 so as to be in intimate contact with the upper surface of the elastic body 50, so as to assist the elastic body 50 in applying a biasing force to the power generation body 1. Furthermore, the sheet 55 may also be fixed to the elastic body 50 with an adhesive, double-sided tape, or the like.

Examples of the material constituting the sheet 55 include an elastomer and a resin, with the elastomer preferably being vulcanized rubber. The sheet 55 of the present embodiment is constituted by butyl rubber. In this way, when a material having low humidity permeability is selected as the material constituting the sheet 55, water vapor inside the tire 70 is blocked, enabling the effects of water vapor inside the tire 70 on the power generation body 1 to be further limited. However, the configuration of the sheet 55 is not particularly limited as long as the sheet is able to assist the elastic body 50 in applying a biasing force to the power generation body 1, and it is also possible for the sheet 55 itself to be omitted.

2-3. Elastic Body

The elastic body 50 is not particularly limited as long as it is constituted by an elastic material. The elastic body 50 can, for example, be constituted as a cord member or as a leaf spring. The elastic body 50, together with the inner surface 720 of the tire 70, sandwich the power generation body 1, biasing the power generation body 1 toward the inner surface 720, and pressing the power generation body 1 against the inner surface 720. In the present embodiment, the elastic body 50 extends along the circumferential direction of the tire 70. The elastic body 50 is preferably fixed to the first member 10 or the second member 20 of the power generation body 1 with an adhesive, double-sided tape, or the like. The power generation body 1 is preferably fixed at a position near the longitudinal center of the elastic body 50. Also, the portion of the elastic body 50 on the outer side of the power generation body 1 in plan view is preferably fixed to the inner surface 720 with an adhesive, double-sided tape, or the like. Note that, in FIG. 2, the elastic body 50 is shown as being curved in conformity with the thickness of the power generation body 1, but the elastic body 50 itself may be a flat plate shape as a whole. Also, the elastic body 50 may have a shape in which the peripheral portion is at least partially bent, for example.

As shown in FIG. 7A, the elastic body 50 of the present embodiment has a rectangular shape in plan view, with the long side being length L1 and the short side being length L2. The elastic body 50 is fixed to the inner surface 720 such that the long side is along the circumferential direction of the tire 70 and the short side is along the width direction of the tire 70 (direction parallel to the rotation axis of the tire 70). From the viewpoint of improving the output of the power generation body 1, the length L1 preferably satisfies L0<L1 and covers the power generation body 1 in the circumferential direction of the tire 70, and, in addition, preferably satisfies $L_c$<L1. Furthermore, from the viewpoint of applying the biasing force uniformly to the power generation body 1 over the width direction, the length L2 preferably satisfies (0.5×L0)<L2. Note that the shape of the elastic body 50 in plan view is not limited thereto, and, for example, the length L2 need not be constant over the long side direction, and may change.

The elastic body 50 preferably has heat resistance, impact resistance and durability, and can be selected as appropriate in consideration of rigidity, mass and the like, such that the power generation amount of the power generation body 1 improves. Examples of the material constituting the elastic body 50 include a metal such as a spring steel material, an elastomer, a resin, and an elastomer or resin foam. The elastic body 50 is not particularly limited as long as it is mainly constituted by these materials, and may be constituted by two or more materials, and may supplementally include materials other than these materials. Examples of the spring steel material include stainless steel (SUS), carbon steel, and alloy steel. Examples of the resin include an engineering plastic such as polycarbonate and polyether ether ketone (PEEK), a fiber reinforced plastic (FRP), and a hard resin such as polypropylene. An ultraviolet curable type of fiber reinforced plastic is preferable from the viewpoint of being fixable in a shape that conforms more closely to the shape of the inner surface 720 of the tire 70. The hard resin may be a resin foam, with use of such a foam enabling the weight of the elastic body 50 to be reduced, and making it possible to improve the power generation amount of the power generation body 1. From the viewpoint of reducing the weight of the elastic body 50, a large number of holes may be formed in the elastic body 50. Also, in order to appropriately configure the rigidity and mass, a configuration such as stacking a plurality of flexible bodies 50 one on the other may be adopted.

Figure 7B:
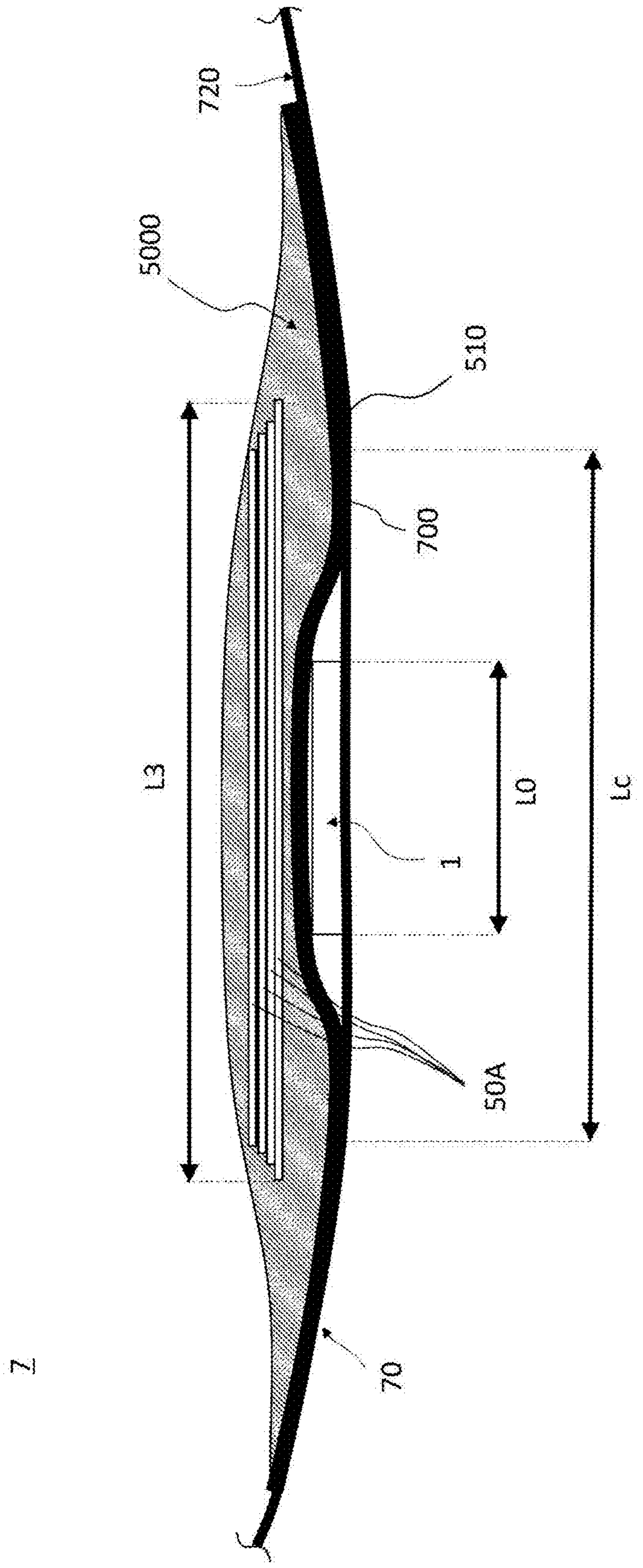
FIG. 7B is a partial cross-sectional view showing an example of an elastic body.

As the cord member, a cord-like member that is constituted by at least one of a metal, an elastomer and a resin can be used, a non-limiting example of which is a line-like member configured for use in reinforcing a tire. FIG. 7B is a partial cross-sectional view in a similar direction to FIG. 2, and shows an example of a tire assembly 7 using such a cord member as the elastic body 50. In the example of FIG. 7B, a tire repair material (patch) is fixed to the inner surface 720 of the tire 70 so as to cover the power generation body 1. The repair material includes a base 5000 mainly formed from an elastomer and a cord layer constituted by a plurality of cord members 50A. The cord members 50A are embedded in the base 5000, and a peripheral portion 510 of the base 5000 is fixed to the inner surface 720 by adhesion. The number and thickness of the cord members 50A constituting the cord layer and number of cord layers are not particularly limited as long as the power generation body 1 is biased. The cord layer may be disposed such that the longitudinal direction of the cord members 50A constituting the cord layer may be disposed along the circumferential direction of the tire 70, or may be disposed at an angle to the circumferential direction of the tire 70. From the viewpoint of promoting power generation of the power generation body 1, a length L3 of the cord members 50A along the circumferential direction of the tire 70 preferably satisfies L0<L3, similarly to the length L1, and, in addition, preferably satisfies Lc<L3. Note that the cord members 50A need not be embedded in the base 5000. The base 5000 may also be omitted, and the sheet 55 may be used instead.

2-4. Module

Figure 8:
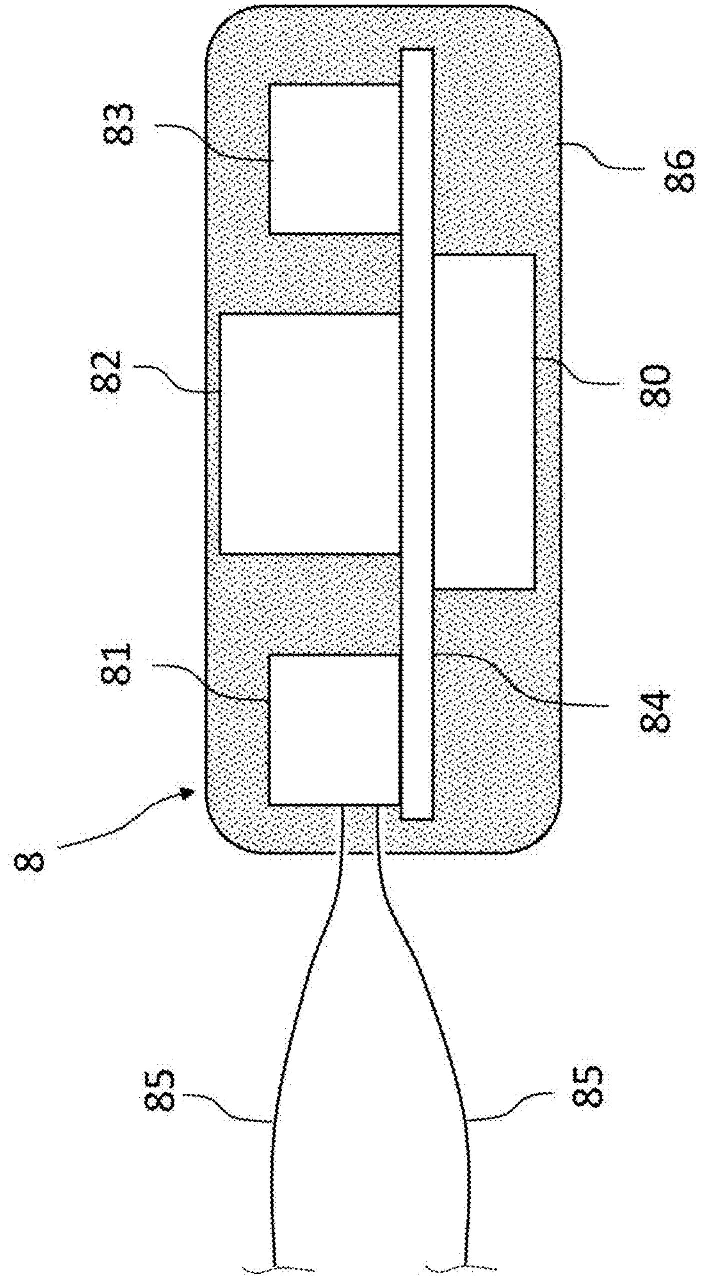
FIG. 8 is a schematic diagram showing the configuration of a sensor module according to one embodiment.
Figure 9:
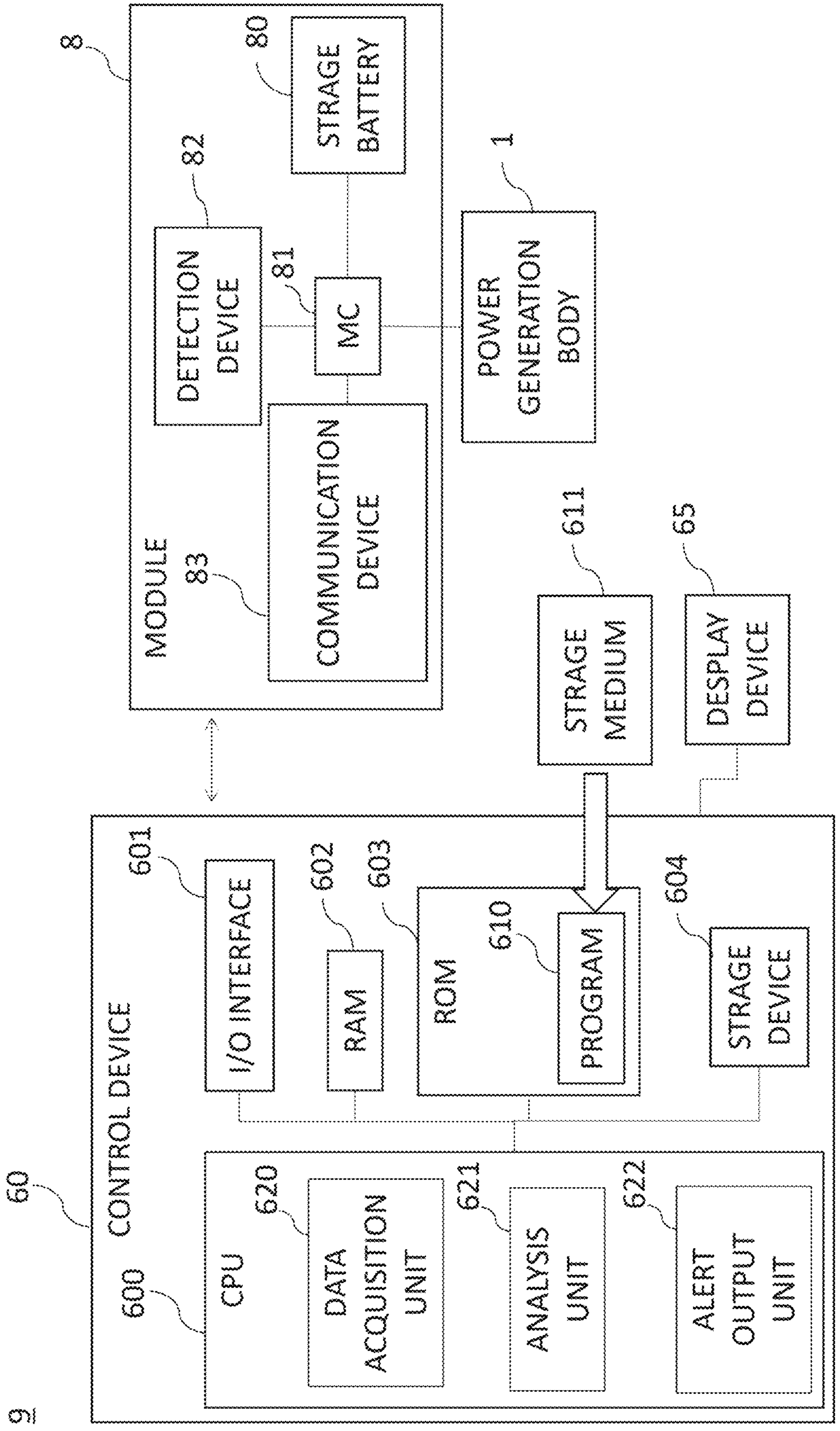
FIG. 9 is a block diagram showing an electrical configuration of the monitoring system.

FIG. 8 is a schematic diagram showing the configuration of the module 8. Also, FIG. 9 is a block diagram showing the electrical configuration of the system 9 that includes the electrical configuration of the module 8. The module 8 is connected to the first electrode 120 and the second electrode 220 of the power generation body 1 by the lead wires 85 and 85. An electrical circuit including the power generation body 1 and the module 8 is thereby formed. That is, the electromotive force generated in the power generation body 1 is utilized by the module 8.

The module 8 includes a storage battery 80 and electronic devices to which power that is output from the power generation body 1 is supplied, and the storage battery 80 and the electronic devices are electrically connected via a printed circuit board 84. The electronic devices of the present embodiment include a microcontroller 81 (hereinafter, also simply referred to as "MC 81"), a detection device 82, and a communication device 83.

The storage battery 80 is a battery that stores power output by the power generation body 1, and may be a general-purpose storage battery mountable on the printed circuit board 84. The storage battery 80 supplies stored power to the MC 81, the detection device 82 and the communication device 83 as necessary.

The detection device 82 is configured to detect the state within the tire 70 and is typically a sensor. The values that the detection device 82 detects as the state within the tire 70 include values relating to tire pressure and values relating to temperature, for example. The detection device 82 outputs the detected values to the MC 81. The MC 81 transmits the values output by the detection device 82 to an external device via the communication device 83 described later. Examples of the external device include the control device 60 of the vehicle 6 on which the tire assembly 7 is mounted, and a portable information processing terminal such as a smartphone, a tablet, or a mobile personal computer.

The communication device 83 includes an antenna and allows the MC 81 to wirelessly perform data transmission and reception with the external device. The communication device 83 may be a general-purpose communication module.

The MC 81 includes a processor, a main memory, and a nonvolatile rewritable storage device. A program for controlling operations of the module 8 is written in a storage device of the MC 81, and the program is executed by the processor. The MC 81 is configured to distribute power output by the power generation body 1 and power stored in the storage battery 80 to the MC 81, the detection device 82 and the communication device 83 as necessary.

Furthermore, the MC 81 detects the voltage or current that is output by the power generation body 1 with a detection circuit not shown. The MC 81 saves the detected voltage or current to the storage device as time series data. The MC 81 transmits the data saved in the storage device to the control device 60 at a predetermined timing. Note that the data that is transmitted may not be the actual data of values detected by the detection circuit, and may alternatively or additionally include the data of physical amounts that are based on at least one of the voltage and current (e.g., power data).

The storage battery 80, the MC 81, the detection device 82, the communication device 83 and the printed circuit board 84 to which these elements are connected are integrally enclosed by an epoxy resin 86. Ingress of water vapor that is inside the tire 70 into the storage battery 80 and the electronic devices 81 to 83 is thereby suppressed, and the storage battery 80, the electronic devices 81 to 83, and the printed circuit board 84 are protected from impacts. A detection element not shown of the detection device 82 may be exposed from the epoxy resin 86 as necessary.

The lead wires 85 and 85 pass through the epoxy resin 86 and extend outside the epoxy resin 86. The lead wires 85 and 85 extending outside the epoxy resin 86 are passed between the sheet 55 and the inner surface 720 of the tire 70, and are respectively connected to the first electrode 120 and the second electrode 220 of the power generation body 1.

3. Operations of Tire Assembly

Hereinafter, the operations of the tire assembly 7 will be described. When the tire assembly 7 is stationary, the mean inter-surface interval and true contact area between the first surface 100 of the first insulating film 110 and the second surface 200 of the second insulating film 210 do not change or hardly change. Thus, charge is not induced or hardly induced in the first electrode 120 and the second electrode 220, and zero power or a minute amount of power is output by the power generation body source 1.

When the tire assembly 7 rotates on the road surface, the portion of the tread part 700 that contacts the road surface receives an impact. Since the impact is absorbed when transmitted to the whole tire 70, deflection occurs particularly on the sidewall parts 702, and the whole tire 70 deforms. Thereafter, the sidewall parts 702 go to return to a normal state from the deformed state, but again receives an impact from the road surface via a different portion of the tread part 700. In this way, the tire 70 repeatedly undergoes expansion and contraction deformation as a whole. The expansion and contraction deformation of the tire 70 is transmitted to the power generation body 1 fixed to the inner surface of the tread part 700. The power generation body 1 deforms in correspondence with the expansion and contraction deformation of the tire 70 that is transmitted. As a result, the mean inter-surface interval and the true contact area change, due to the first insulating film 110 and the second insulating film 210 moving toward and away from each other or shifting in the surface direction relative to each other. Thus, electric charge is induced in the first electrode 120 and the second electrode 220, and the power generation body 1 outputs more power than when the tire assembly 7 is stationary.

Figure 10:
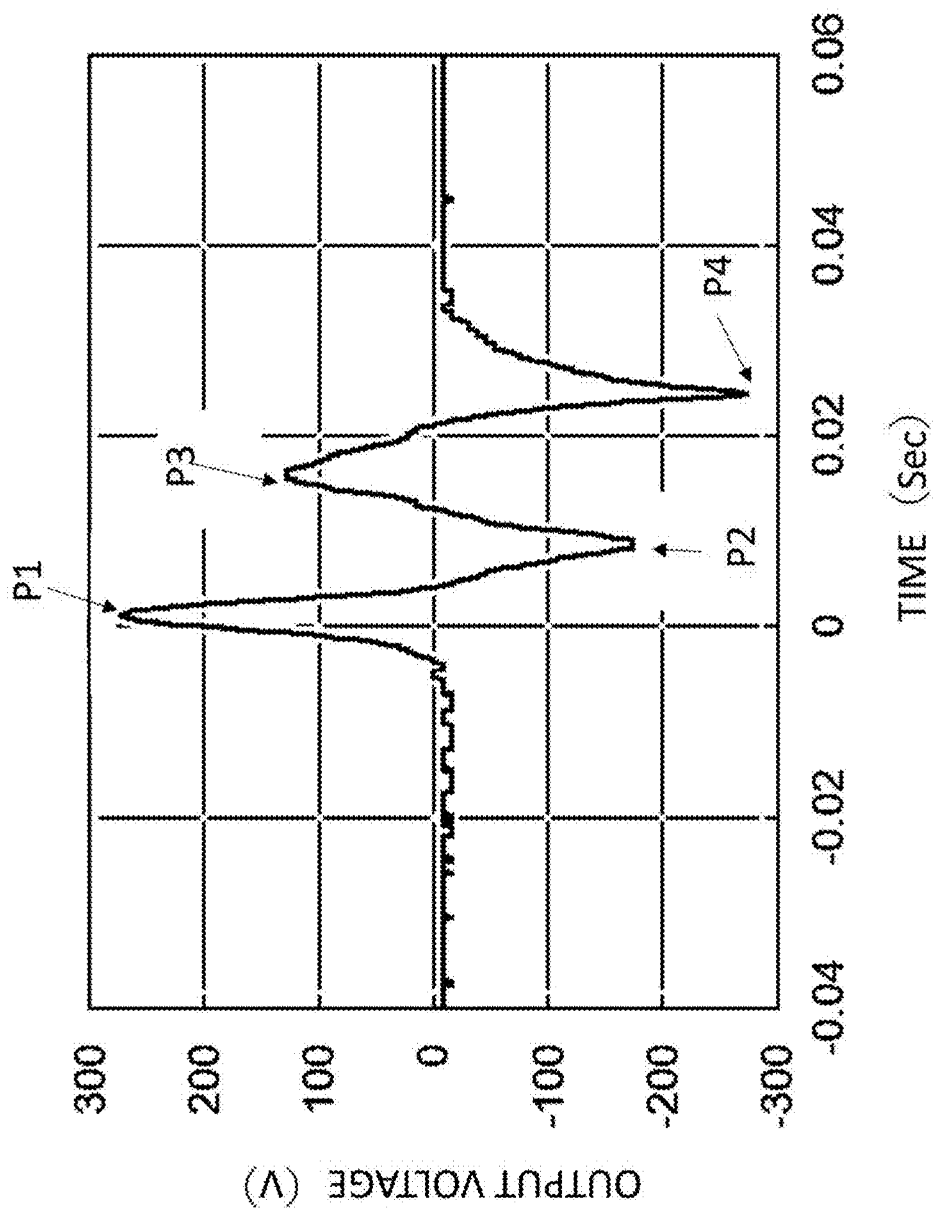
FIG. 10 is a graph of the output voltage of the tire assembly.

The timing at which the impact from the road surface is best transmitted to the power generation body 1 during one rotation of the tire assembly 7 is while the power generation body 1 moves through the lowest position, that is, from when the power generation body 1 starts approaching the road surface most closely until when the power generation body 1 starts moving away from the road surface. The current that is removed from the power generation body 1 is proportional to the temporal change in the mean inter-surface interval between the first surface 100 and the second surface 200. The largest temporal change in the mean inter-surface interval thus occurs while the power generation body 1 moves through the lowest position, and positive and negative peaks P1 to P4, such as shown in FIG. 10, appear in the voltage waveform that is output by the power generation body 1. During this period, the elastic body 50 utilizes that elastic force to assist the power generation body 1 in outputting a larger peak voltage. Here, the position where the tire 70 starts contacting the road surface is referred to as a "ground contact start position", and the position where the tire 70 starts moving away from the road surface is referred to as a "ground contact end position". The distance from the ground contact start position to the ground contact end position is equal to or substantially equal to the ground contact length $L_c$ of the tire 70.

Figure 11A:
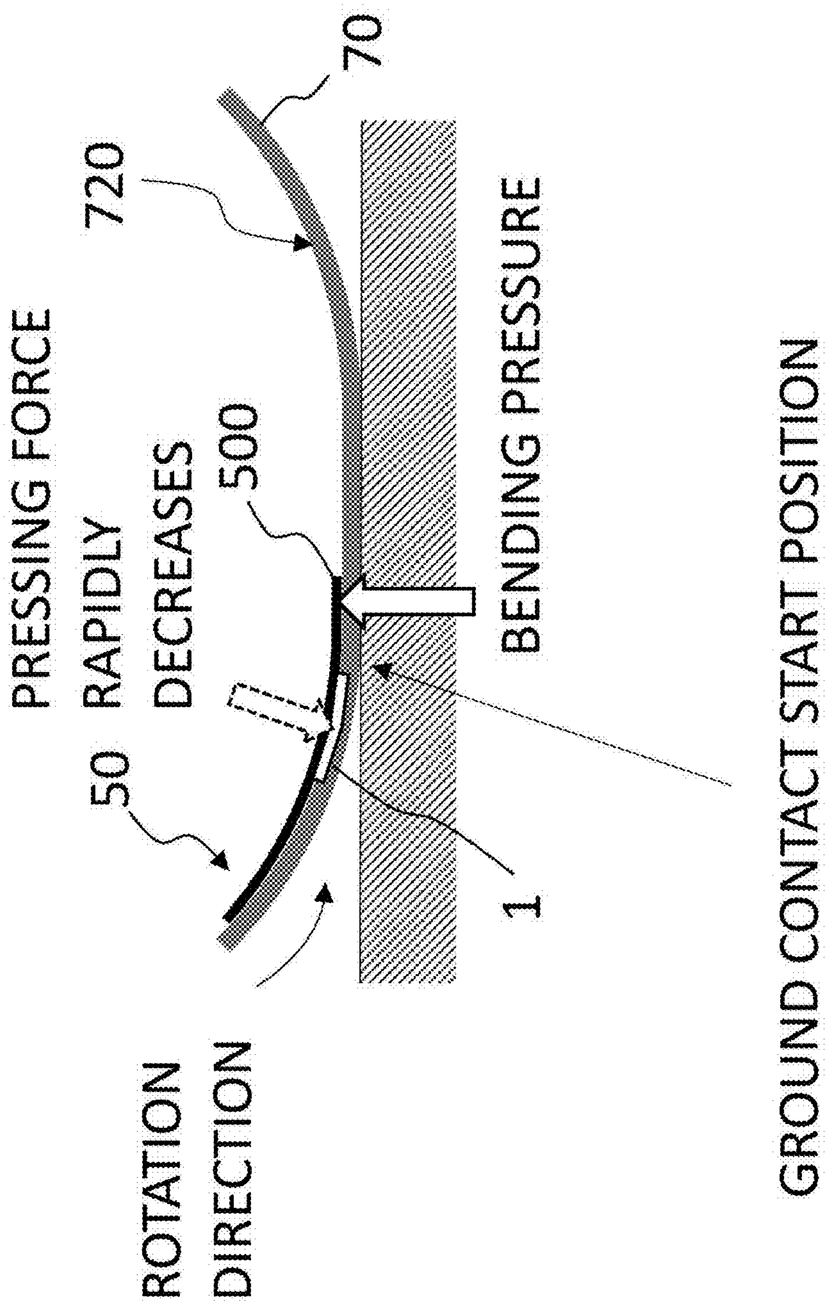
FIG. 11A is a diagram illustrating operations of the tire assembly.

FIGS. 11A to 11D are diagrams illustrating operations of the elastic body 50 when the power generation body 1 passes along the road surface at the lowest position. When the length L1 of the elastic body 50 satisfies $L0<L1$ and $L_c<L1$, a leading end portion 500 of the elastic body 50 reaches the ground contact start position before the leading end portion of the power generation body 1. When the leading end portion 500 of the elastic body 50 passes through the ground contact start position, bending pressure such as shown in FIG. 11A is applied to the elastic body 50 due to deformation of the tire 70 caused by ground contact. A pressing force toward the inner surface 720 that is applied to the power generation body 1 by the elastic body 50 thereby rapidly decreases, and the first member 10 and the second member 20 move away from each other. The amount of power generated by the power generation body 1 thus increases locally, and the peak P1, which is the initial peak, appears in the voltage waveform of the power generation body 1 (see FIG. 10).

Figure 11B:
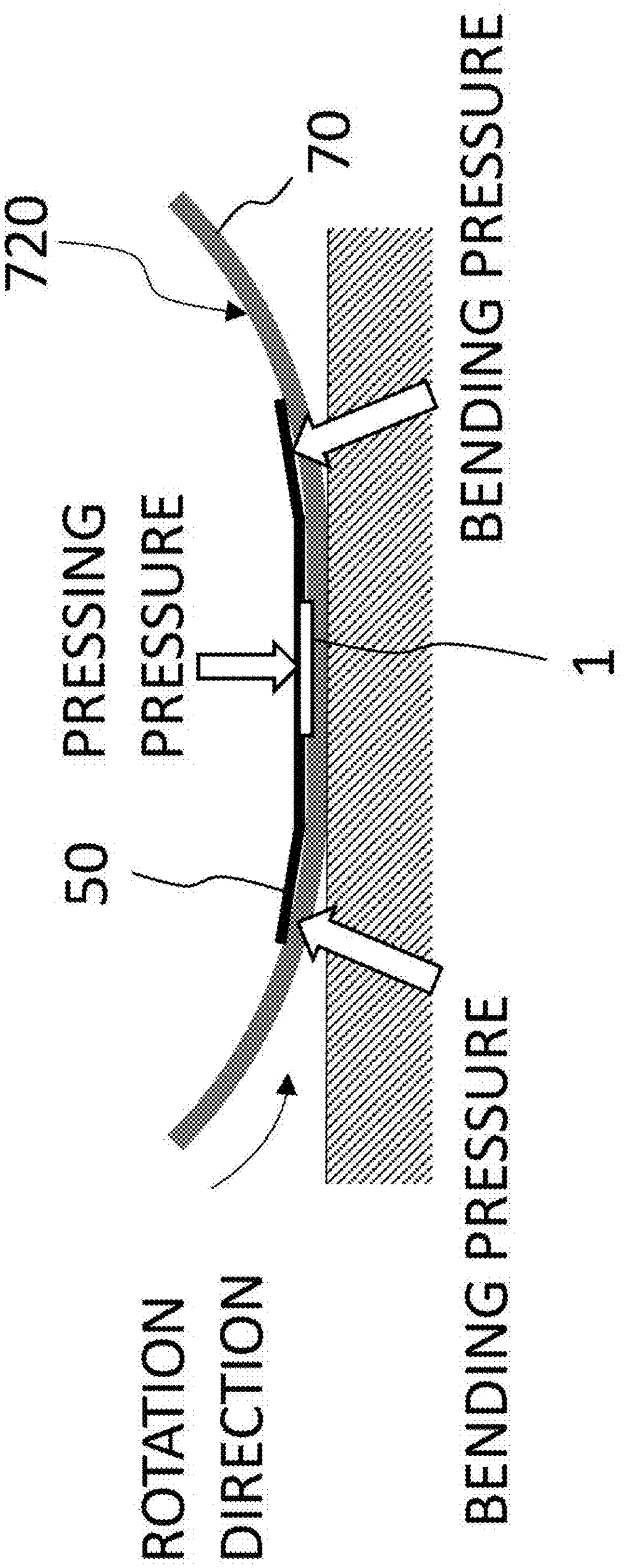
FIG. 11B is a diagram illustrating operations of the tire assembly.

When the tire assembly 7 rotates further from the state of FIG. 11A, a position is reached where the entirety of the power generation body 1 is located between the ground contact start position and the ground contact end position (assuming $L0<L_c$), as shown in FIG. 11B. On the other hand, since the elastic body 50 straddles between both the ground contact start position and the ground contact end position, bending pressure such as shown in FIG. 11B is applied to the elastic body 50 near the ground contact start position and the ground contact end position. A pressing force that presses toward the inner surface 720 is thereby applied to the power generation body 1 by the elastic body 50, and the first member 10 and the second member 20 move toward each other. Furthermore, in the ground contact patch between the tire assembly 7 and the road surface, the tire 70 deforms due to being subjected to an upward force, thus increasing the pressing force that is applied to the power generation body 1. The second peak P2, which is in the opposite direction to the peak P1, appears in the voltage waveform of the power generation body 1.

Figure 11C:
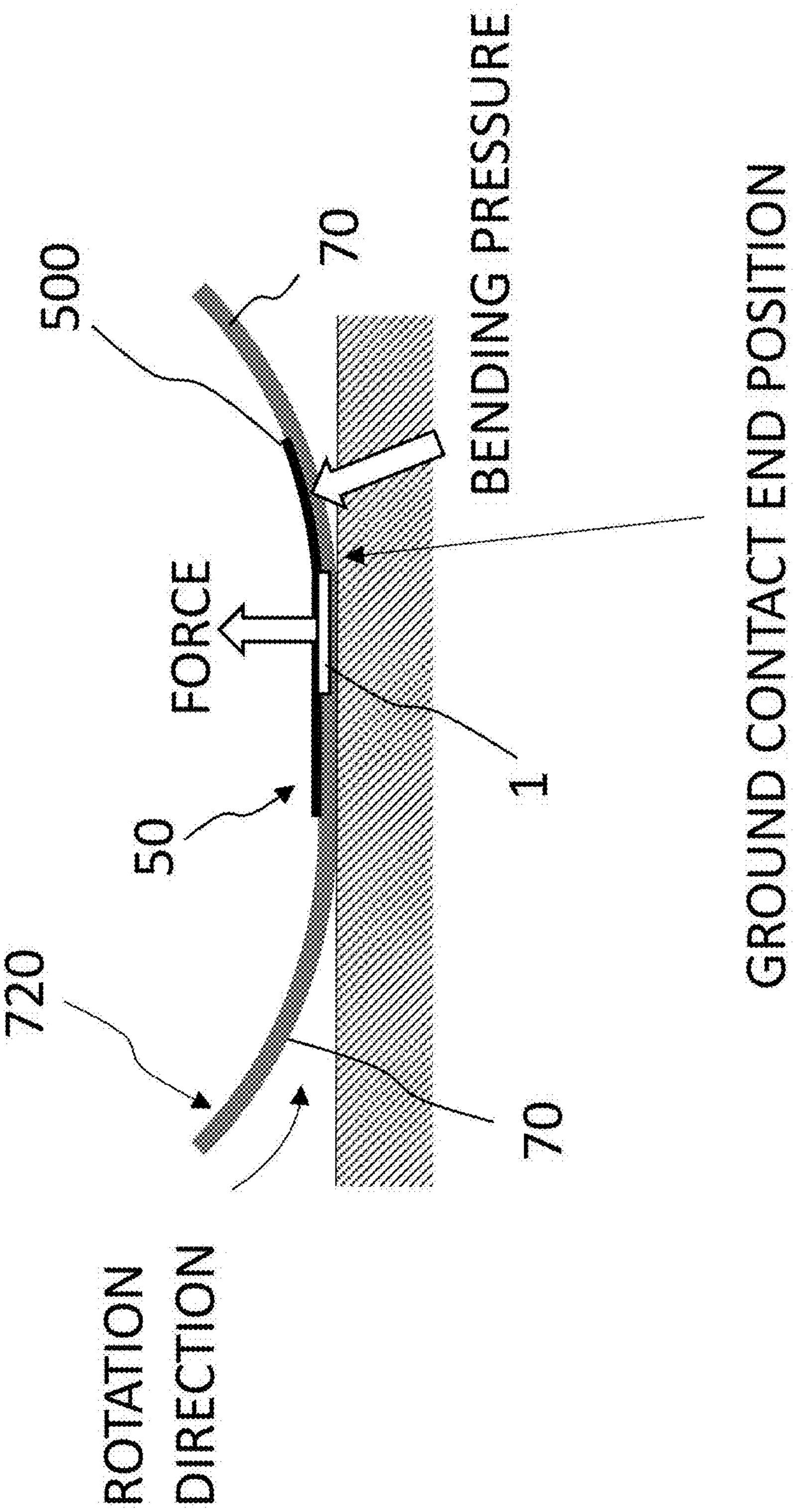
FIG. 11C is a diagram illustrating operations of the tire assembly.

When the tire assembly 7 rotates further from the state of FIG. 11B, bending pressure is applied to the elastic body 50 near the ground contact end position, as shown in FIG. 11C. A force (detaching pressure) acting in the opposite direction to the pressing force that acts toward the inner surface 720 is thereby rapidly applied to the power generation body 1 by the elastic body 50, and the first member 10 and the second member 20 move away from each other. The amount of power generated by the power generation body 1 thus increases locally, and the third peak P3 appears in the voltage waveform of the power generation body 1.

When a trailing end portion 501 of the elastic body 50 passes through the ground contact end position after the state shown in FIG. 11C, the first member 10 and the second member 20 of the power generation body 1 move toward each other in reaction of the detaching pressure applied by the elastic body 50. The fourth peak P4, which is in the opposite direction to the peak P3, thus appears in the voltage waveform of the power generation body 1.

Figure 11D:
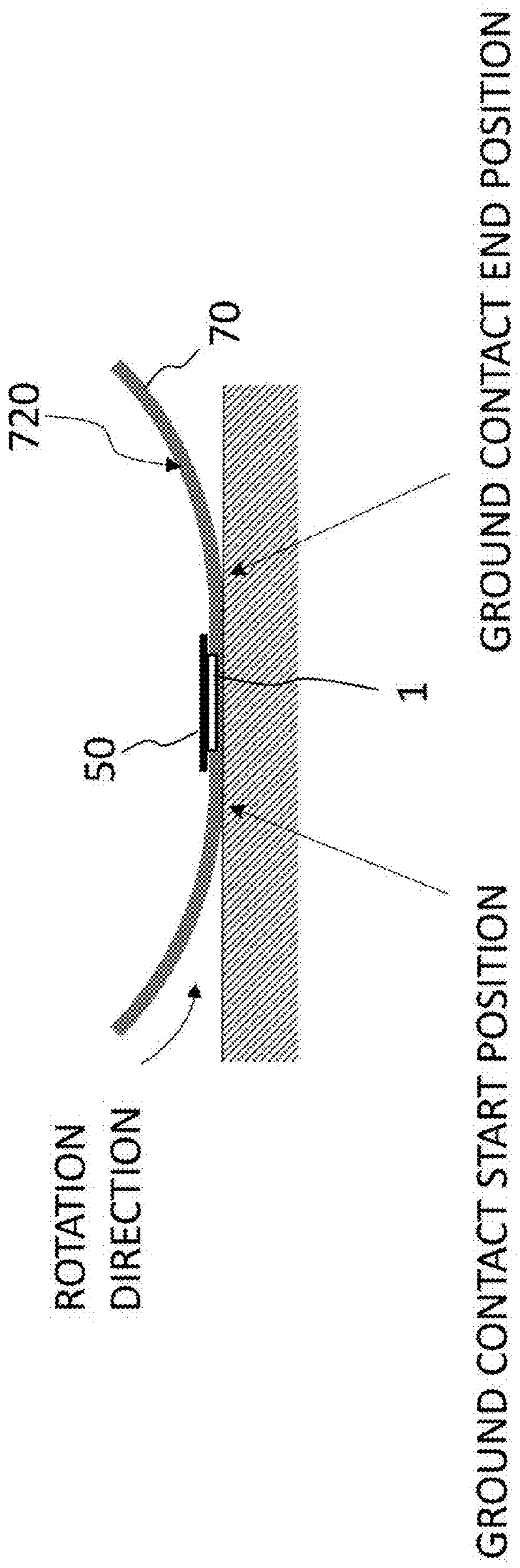
FIG. 11D is a diagram illustrating operations of the tire assembly.

Note that when $L_c$>L1 as shown in FIG. 11D, the elastic body 50 does not straddle between the ground contact start position and the ground contact end position, even if the entirety of the power generation body 1 is located between the ground contact start position and the ground contact end position, and the elastic body 50 is not subjected to bending pressure such as shown in FIG. 11B. No force or hardly any force is thus applied to the power generation body 1 by the elastic body 50, and the output of the power generation body 1 is low compared to when $L_c$<L1.

The peaks P1 to P4 such as shown in FIG. 10 appear prominently each time the tire assembly 7 completes one rotation and the power generation body 1 passes through the lowest position. Accordingly, the time period from when peaks appear until when similar peaks next appear represents the time period of one rotation of the tire assembly 7, and information relating to the rotation speed of the tire assembly 7 can be said to be acquirable from the data of voltages that are output by the power generation body 1.

Also, in the case where conditions such as the rotation speed of the tire assembly 7 and the road surface on which the tire assembly 7 rotates are the same, the temporal change in the mean inter-surface interval differs between when the tire 70 is normal (not worn) and when the tire 70 is worn (when wear indicators appear). It can be determined whether the tire 70 is worn, by voltage waveforms that are output by the power generation body 1 at a predetermined rotation speed being acquired in advance for the case where the tire 70 is normal and the case where the tire 70 is worn, and compared with voltage waveforms that are output by the power generation body 1 at that rotation speed. Accordingly, information relating to wear of the tire 70 constituting the tire assembly 7 can be said to be acquirable from the voltage waveforms that are output by the power generation body 1.

Furthermore, when conditions such as the rotation speed of the tire assembly 7 and the degree of wear of the tire 70 are the same, the temporal change in the mean inter-surface interval differs depending on the state of the road surface (asphalt, gravel road, wet road surface, etc.). The state of the road surface on which the tire assembly 7 is currently rotating (road surface on which the vehicle 6 is traveling) can be judged, by voltage waveforms that are output by the power generation body 1 at a predetermined rotation speed being acquired in advance for road surfaces in different states, and compared with voltage waveforms that are output by the power generation body 1 at that rotation speed. Accordingly, information relating to the state of the road surface on which the vehicle 6 travels can be said to be acquirable from the voltage waveforms that are output by the power generation body device 1.

The MC 81 stores power output by the power generation body 1 in the storage battery 80. The MC 81 monitors the remaining battery capacity of batteries of the MC 81 itself, the detection device 82 and the communication device 83 in a predetermined cycle, and, when the remaining battery capacity of any of the batteries falls to a given threshold value, operates such that the power stored in the storage battery 80 is supplied to that battery.

In parallel with power distribution, the MC 81 saves the detected output values of the power generation body 1 and the values output by the detection device 82 to the storage device as time series data. The MC 81 transmits the various data saved in the storage device to the control device 60 at a predetermined timing. The data transmission interval can be set to once every 40 seconds, for example.

4-1. Configuration of Monitoring System

Hereinafter, a configuration example of the system 9 will be described. The system 9 can be configured to start the following monitoring processing when the control device 60 is powered on and to stop the monitoring processing when a given time period elapses after the vehicle 6 stops, for example.

FIG. 9 is a block diagram showing an electrical configuration of the system 9. In the system 9, the control device 60 acquires output data transmitted from the module 8 and monitors information relating to the tire 70. The control device 60 monitors the tire pressure of the tire 70, the rotation speed of the tire 70 and the like, for example. The tire pressure, rotation speed and the like of the tire 70 are utilized in processing by a tire pressure monitoring system (TPMS), load estimation processing by the vehicle 6, and other processing. Also, the control device 60 monitors the wear state of the tire 70 and the state of the road surface on which the vehicle 6 travels, for example.

The control device 60 includes a CPU 600, an I/O interface 601, a RAM 602, a ROM 603, and a nonvolatile rewritable storage device 604. The I/O interface 601 is a communication device for performing wired or wireless communication with an external device such as a display device 65 or the tire assembly 7. The ROM 603 stores a program 610 for controlling the operations of the system 9. The program 610 is written to the ROM 603 from a storage medium 611 such as a CD-ROM or a USB memory. The CPU 600 operates in a virtual manner as a data acquisition unit 620, an analysis unit 621 and an alert output unit 622, by reading out the program 610 from the ROM 603 and executing the read program 610. The operations of the various units will be described in detail later. Note that the storage location of the program 610 may be the storage device 604 instead of the ROM 603. Also, the RAM 602 and the storage device 604 are utilized as appropriate in computations of the CPU 600.

The storage device 604 includes a hard disk, a flash memory or the like. A pressure loss threshold value for the analysis unit 621 to determine whether the tire 70 has lost pressure is saved in advance in the storage device 604. The pressure loss threshold value may be the value of a tire pressure below which it is determined that the tire 70 has lost pressure. Alternatively, the pressure loss threshold value can also be a tire pressure dropped to at a predetermined pressure loss rate from an initial value of the tire pressure of each tire that is saved in the storage device 604 in advance.

Also, output waveforms of the power generation body 1 under various travel conditions of the vehicle 6 are saved in advance in the storage device 604 as voltage waveforms, for example. The voltage waveforms that are saved may, for example, be waveforms obtained when the tire 70 is normal and waveforms obtained when the tire 70 is worn, at a predetermined rotation speed of the tire assembly 7. Also, the voltage waveforms that are saved may, for example, be waveforms obtained when the vehicle 6 travels on different types of road surfaces, at a predetermined rotation speed of the tire assembly 7. Furthermore, waveforms obtained when the tire 70 is normal and waveforms obtained when the tire 70 is worn may be saved for each type of road surface.

The mode of the display device 65 is not limited as long as various information can be displayed and conveyed to the user. For example, the display device 65 can be realized in any mode such as a liquid crystal monitor, a liquid crystal display device, an organic EL display or a plasma display.

The attachment position of the display unit 65 can be selected as appropriate, with the display unit 65 desirably being provided in a position that is obvious to the driver, such as on the instrument panel, for example. In the case where the control device 60 is connected to a car navigation system, it is also possible to use a monitor for car navigation as the display device 65, or to use a multi-information display as the display device 65.

4-2. Operations of Monitoring System

Hereinafter, processing in the case where the detection device 82 of the module 8 detects values relating to the tire pressure of the tire 70 will be described.

The data acquisition unit 620 acquires various data transmitted from the MC 81. This data includes data of values relating to the tire pressure of the tire 70 detected by the detection device 82, data of output voltages of the power generation body 1 detected by the MC 81, and data identifying the MC 81 (i.e., tire assembly 7), which is the transmission source of this data. Note that the positions of the wheels to which the tire assemblies 7*a* to 7*d* are respectively mounted are assumed to have been associated in advance.

The analysis unit 621 calculates the current tire pressure for each tire assembly 7 from the data of values relating to the tire pressure of the tire 70. The analysis unit 621 compares the calculated tire pressure with the pressure loss threshold value that is saved in the storage device 604, and determines whether there are any tires 70 that have lost pressure (anomalous) or not (normal). Also, the analysis unit 621 may specify which tire 70 has lost pressure with data that identifies the tire assembly 7. Upon determining that the tires 70 have not lost pressure and are all normal, the analysis unit 621 repeats similar processing for data that is received next. On the other hand, upon determining that there is an anomaly, the analysis unit 621 causes the alert output unit 622 to output a pressure loss alert. The alert output unit 622 notifies the user that the tire 70 has lost pressure, by displaying an alert message about the pressure loss on the display device 65, for example, and prompts the user to adjust the tire pressure.

The analysis unit 621 calculates the rotation speed of the tire assembly 7 from the data of output voltages of the power generation body 1, in parallel with or before or after the above processing. In this way, the power generation body 1 may be utilized as a speed sensor. The calculated rotation speed may also be utilized in indirect TPMS. Furthermore, the analysis unit 621 compares the data of output voltages of the power generation body 1 with the voltage waveforms that are saved in the storage device 604, and determines whether there are any worn tires 70 (worn) or not (normal). The analysis unit 621 may specify which tire 70 is worn with data that identifies the tire assembly 7. Upon determining that the tires 70 are not worn and are all normal, the analysis unit 621 repeats similar processing for data that is received next. On the other hand, upon determining that there is a worn tire, the analysis unit 621 causes the alert output unit 622 to output an alert. The alert output unit 622 notifies the user that the tire 70 is worn, by displaying an alert message about the wear on the display device 65, and prompts the user to replace the tire.

The analysis unit 621 compares the data of output voltages of the power generation body 1 with the voltage waveforms that are saved in the storage device 604, in parallel with or before or after the above processing, and judges the state of the road surface on which the vehicle 6 is currently travelling. The condition of the road surface may be judged every given time cycle, for example.

5. Modifications

Although one embodiment of the present invention has been described, the invention is not limited to the above embodiment, and various changes can be made without departing from the spirit of the invention. For example, the following changes are possible. Also, the gists of the following modifications can be combined as appropriate.

5-1: In the above embodiment, information relating to the tire 70 is monitored based on time series data of the voltages that are output by the power generation body 1, but the tire 70 may be monitored based on time series data of other physical amounts, such as current that flows through the electrical circuit to which the power generation body 1 is connected and power that is supplied by the power generation body 1.

5-2: In the above embodiment, both the first surface 100 and the second surface 200 have an undulating shape. However, the power generation body 1 may be configured such that only one of the first surface 100 and the second surface 200 has an undulating shape.

5-3: The first electrode 120 may be configured by weaving conductive fibers into a woven fabric shape. The fibers can, for example, be stainless steel wires or Cu wires having flexibility. Furthermore, the first surface 100 may be formed by covering the outer peripheral surface of the fibers with the first insulating film 110. Similarly, the second electrode 220 may be configured by weaving conductive fibers into a woven fabric shape, or the second surface 200 may be formed by covering the outer peripheral surface of the fibers with the second insulating film 210. The fibers can, for example, be stainless steel wires or Cu wires having flexibility.

5-4: The power generation body 1 may include a plurality of first insulating films 110, second insulating films 210, first electrodes 120, and first bases 130.

5-5: The detection device 82, as a tire pressure detection device inside the tire 70, is not limited in terms of detection method. For example, a strain gauge sensor, a diaphragm sensor or a semiconductor sensor can be used. Also, the detection device 82 may, for example, be a temperature sensor that detects the temperature inside the tire 70 or a vibration detection sensor (acceleration sensor) that detects vibration of the tire 70.

5-6: In the system 9 of the above embodiment, the analysis unit 621 perform processing for calculating the tire pressure and rotation speed of the tire 70 and for comparing the output waveforms of the power generation body 1. However, the system 9 may be configured such that the MC 81 performs this processing. At this time, the pressure loss threshold value and output waveforms of the power generation body 1 that are saved in advance in the storage device 604 may be saved in the storage device of the MC 81.

5-7: The location for installing the module 8 is not limited to the above embodiment and can be changed as appropriate. For example, the installation location may be on the inner surface of the shoulder parts 701 or the sidewall parts 702.

5-8: The elastic body 50 may extend continuously around the inner circumference of the tire 70. In other words, the lengths L1 and L3 may be comparable to the inner circumference of the tire 70. Also, regardless of the configuration of the elastic body 50, the length thereof along the circumferential direction of the tire 70 may be the same as the ground contact length $L_c$ of the tire 70 or may be less than $L_c$. In the case where the tire 70 is constituted as a tube tire, the power generation body 1 may be disposed between the tube and the inner surface 720 of the tire 70, and the tube may be utilized as the elastic body 50. Also, the sheet 55 of the tire assembly 7 may be omitted.

5-9: The tire assembly 7 may include a plurality of power generation bodies 1, and one elastic body 50 may be configured to collectively bias the plurality of power generation bodies 1. Also, the tire assembly 7 may include a plurality of power generation bodies 1 and a plurality of flexible bodies 50 that respectively bias the power generation bodies 1, and respective pairs of power generation bodies 1 and elastic bodies 50 may be applied to different applications. In other words, the tire assembly 7 may be constituted to include a pair for power supply and a pair for tire monitoring. Furthermore, the plurality of flexible bodies 50 may differ in lengths L1 and L3 and type.

Working Examples

The following shows tests conducted by the inventors and results thereof. However, the present invention is not limited thereto.

Test 1

Three types of the tire assemblies 7A to 7C according to working examples 1 and 2 and a reference example were prepared. Apart from the configurations of the elastic bodies being different from each other, these tire assemblies 7A to 7C all share common configurations, which are similar to the above embodiment. The three types of the tire assemblies 7A to 7C mounted on the wheel 71A were installed in a drum-type testing device such as shown in FIG. 12. The testing device includes a rotation shaft 90, a cylindrical drum 91 that is connected to the rotation shaft 90 and rotates together with the rotation shaft 90, and a shaft 92 on which the wheel 71A is mounted. The rotation shaft 90 is rotationally driven by a drive device not shown, and is configured to rotate the drum 91 at a predetermined speed. The shaft 92 is configured to apply a predetermined wheel load to the wheels 71A and the tire assemblies 7A to 7C, and is positioned such that the tire assemblies 7A to 7C rotate following rotation of the drum 91. With this testing device, the tire assembly is rotated at a given speed by the drum 91 while applying a predetermined wheel load to the tire assemblies 7A to 7C, and the output voltage of a power generation body 1A is measured by the data logger 93 electrically connected to the power generation body 1A.

The tire size was 215/40R17 (diameter of approx. 604 mm), the internal pressure was 250 kPa, the wheel load was 200 kg, and the circumferential length of the ground contact patch between the drum 91 and the tire assemblies 7A to 7C was 90 mm. In other words, in this test, a tire assembly with a ground contact length $L_c$ of 90 mm was simulated. The rotational speed of the tire assembly was a value equivalent to 50 km/h. The length L0 of each side of the power generation body 1A was 50 mm.

The flexible bodies according to working examples 1 and 2 and the reference example were each constituted as shown in Table 1 below.

TABLE 1

| | Material | L1 (mm) | L2 (mm) | Thickness (mm) |
|---|---|---|---|---|
| Working example 1 | SUS304-CSP | 150 | 50 | 0.5 |
| Working example 2 | polypropylene foam | 150 | 50 | 2 |
| Reference example | SUS304 | 150 | 50 | 0.2 |

As can be seen from Table 1, the flexible bodies of working examples 1 and 2 and the reference example differed in material and thickness. The thicknesses were respectively determined with consideration for the rigidity required in order to constitute the tire assembly. The elastic body according to working example 2 had a density of approximately 0.4 g/cc, which was smaller than other flexible bodies, and was the lightest in terms of the overall mass of the elastic body. Note that the polypropylene foam was about twice as light. The elastic body of working example 1 and the elastic body of the reference example were both constituted by SUS304 stainless steel, but the material of the elastic body of working example 1 was a spring steel material, whereas the material of the elastic body of the reference example was a stainless steel that is generally not used for springs.

Test Results

Figure 13A:
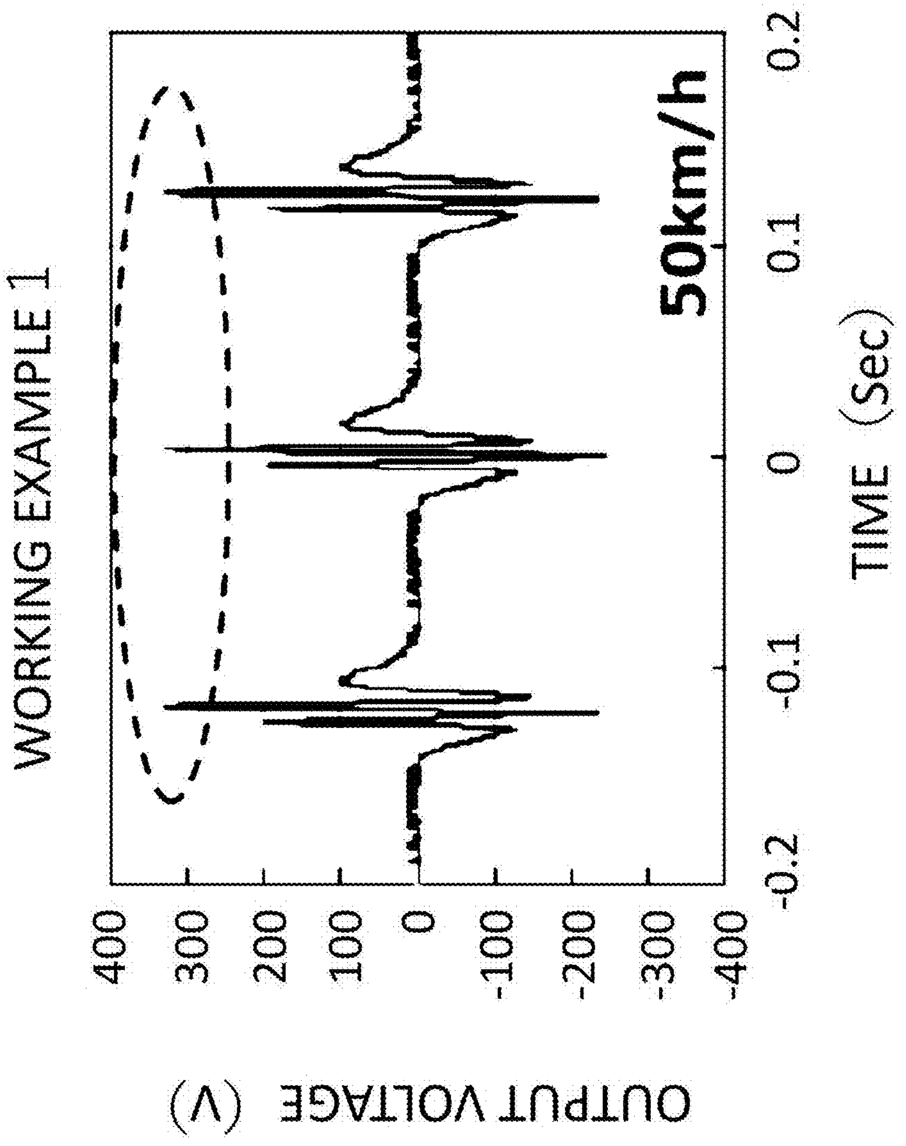
FIG. 13A is a graph of the output voltage of a tire assembly according to working example 1.
Figure 13B:
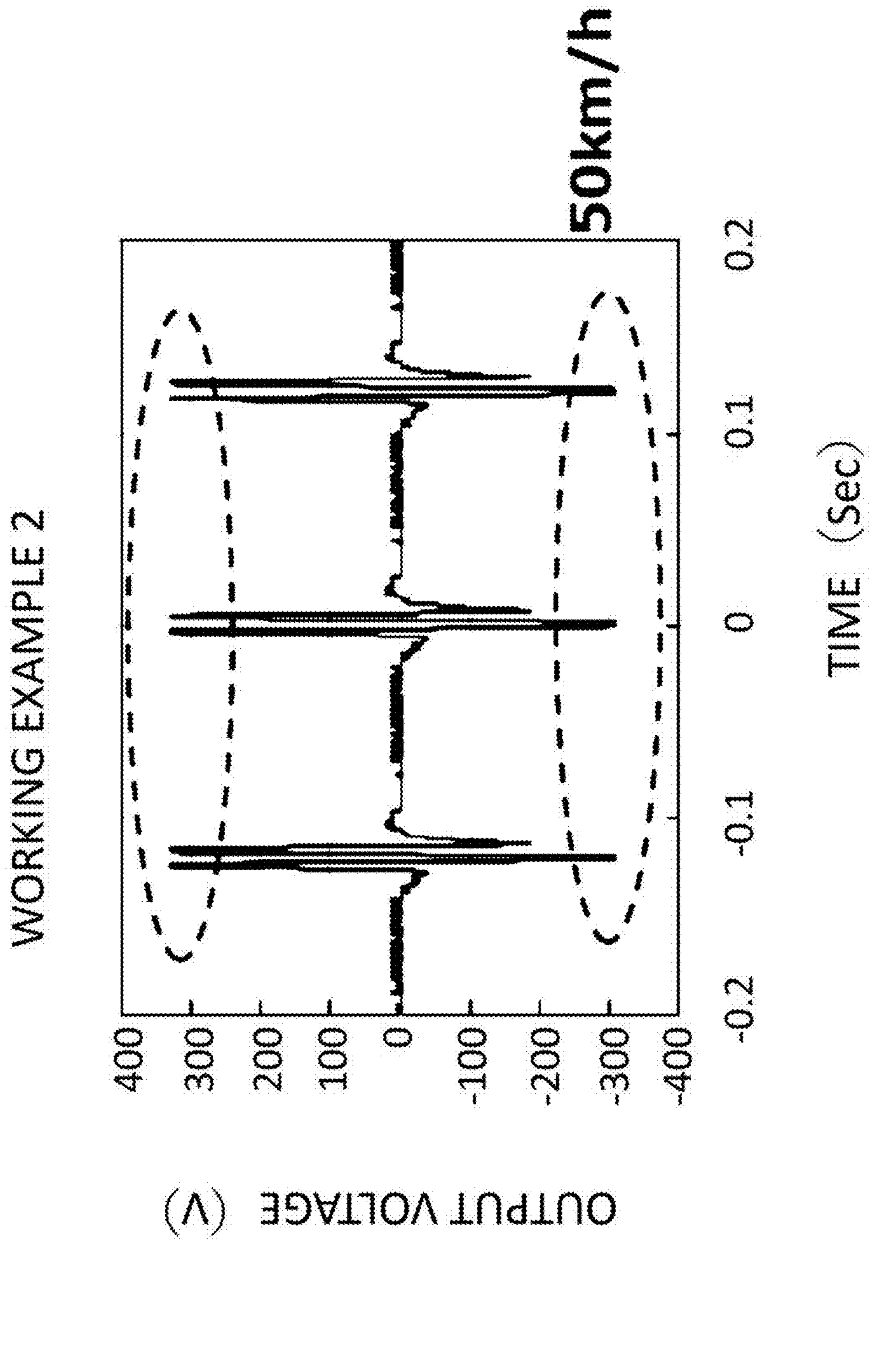
FIG. 13B is a graph of the output voltage of a tire assembly according to working example 2.
Figure 13C:
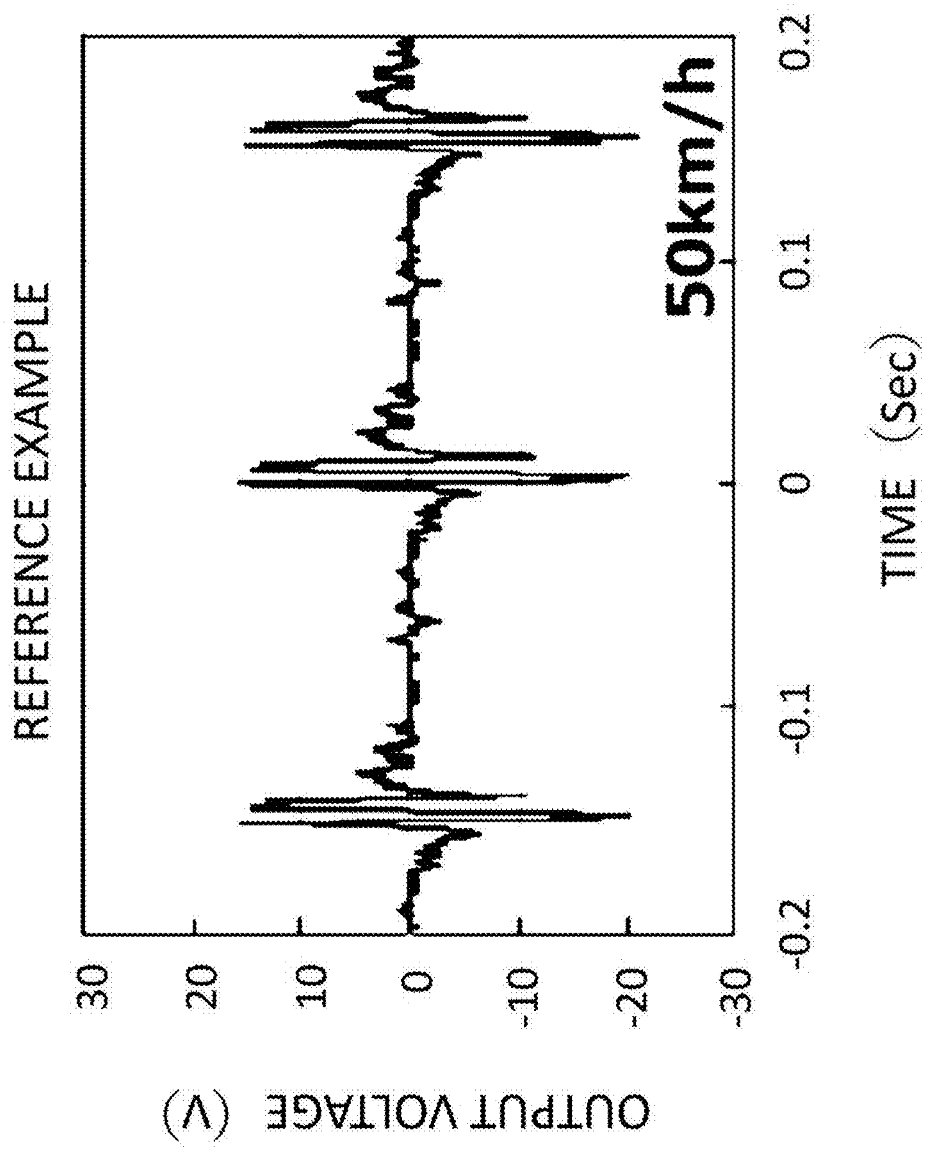
FIG. 13C is a graph of the output voltage of a tire assembly according to a reference example.

Graphs of the output voltage (V) of the power generation body 1A with respect to rotation time (Sec) are as respectively shown in FIGS. 13A to 13C. Note that, in FIGS. 13A to 13C, the scales of the vertical axes differ from each other, for the convenience of description. The magnitudes of the output voltage peaks of the tire assemblies 7A and 7B according to working examples 1 and 2 greatly exceeded the magnitude of the output voltage peaks of the tire assembly 7C according to the reference example, and were saturated to the upper limit (300V) of the measurement device. In particular, in working example 2, the values of the peaks of the output voltages increased in both the positive and negative directions. This result confirmed that the power generation amount of the power generation body 1A was further increased by making the elastic body lighter.

Test 2

Tire assemblies 7D and 7E according to working examples 3 and 4 were further prepared. The tire assemblies 7D and 7E according to working examples 3 and 4 had a similar configuration to the tire assembly 7B according to working example 2, but the lengths L1 of the elastic bodies differed from each other, with L1 of working example 3 being 120 (mm), and L1 of working example 4 being 100 (mm). The tire assemblies 7B, 7D and 7E according to working examples 2 to 4 were each installed in the testing device shown in FIG. 12 and rotated under similar conditions to test 1, and the output voltages were compared.

Test Results

Figure 14A:
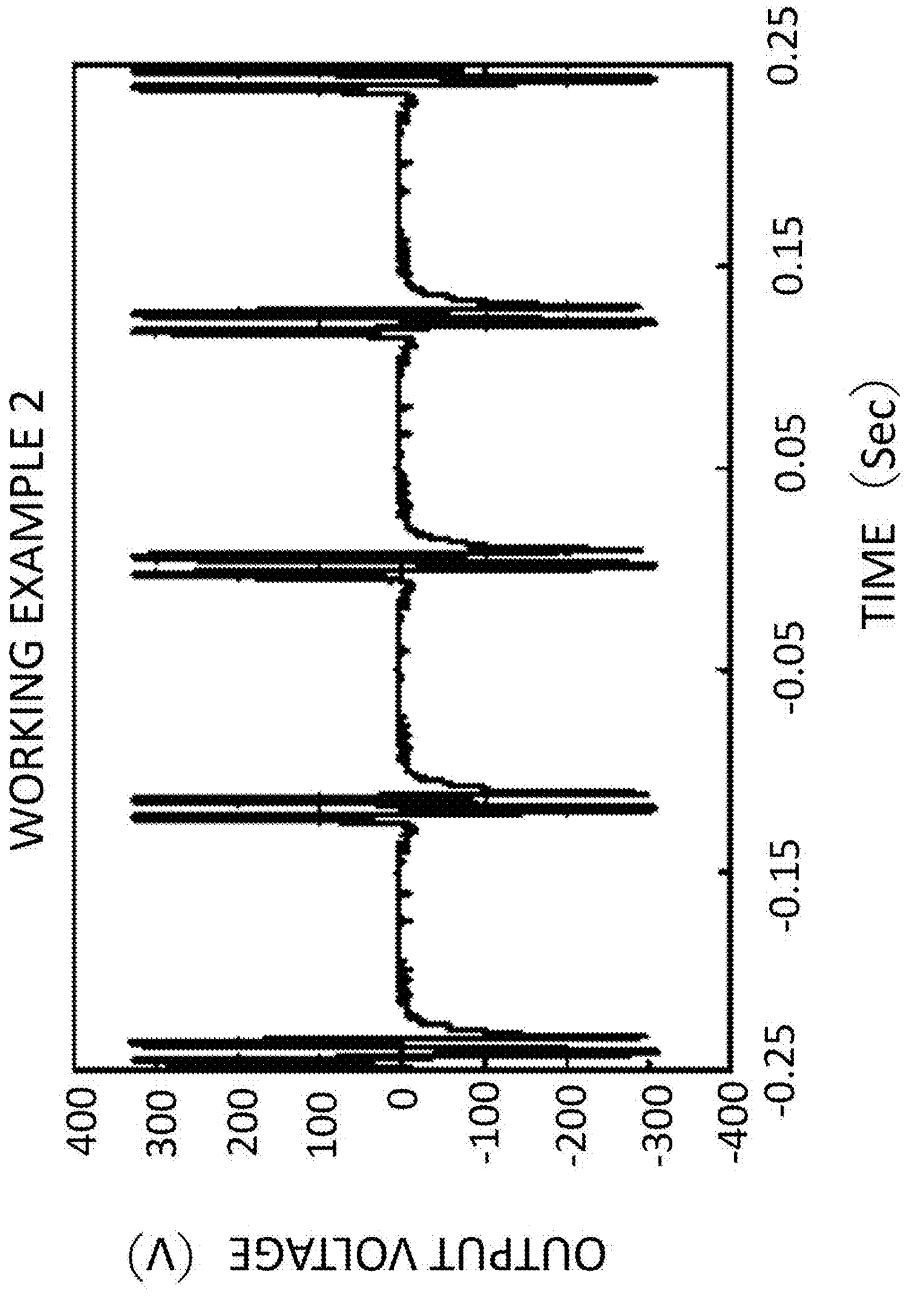
FIG. 14A is a graph of the output voltage of the tire assembly according to working example 2.
Figure 14B:
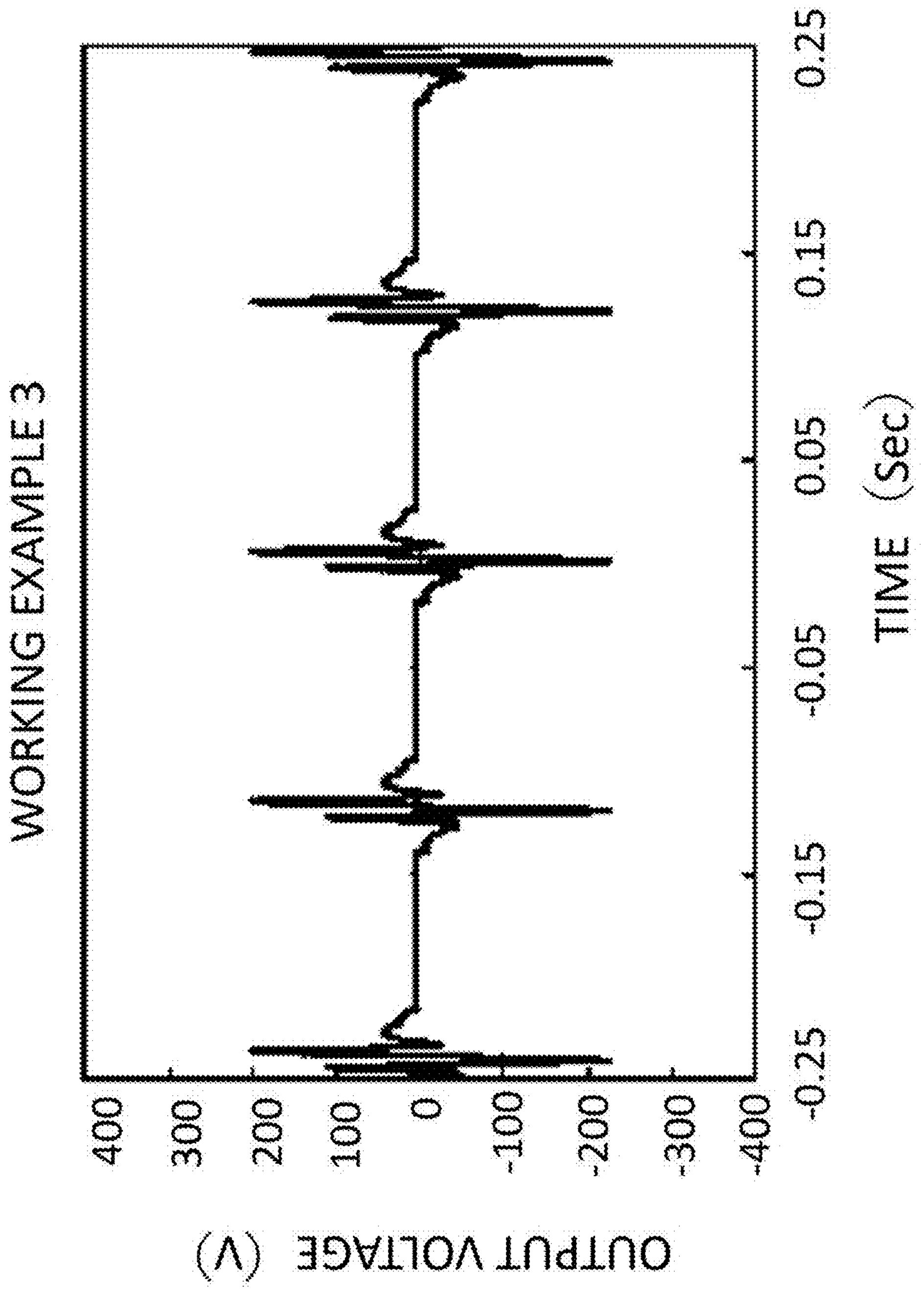
FIG. 14B is a graph of the output voltage of a tire assembly according to working example 3.
Figure 14C:
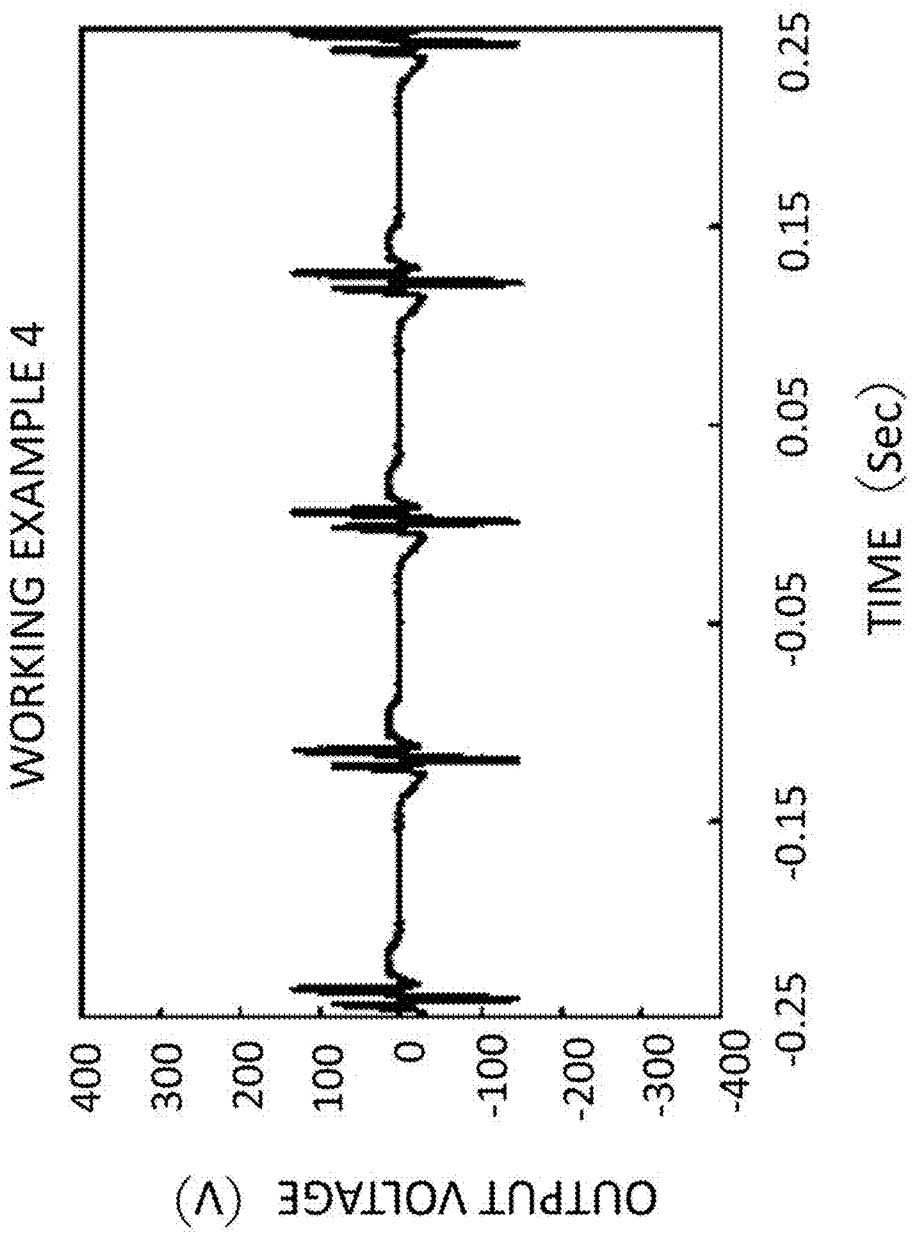
FIG. 14C is a graph of the output voltage of a tire assembly according to working example 4.
Figure 14D:
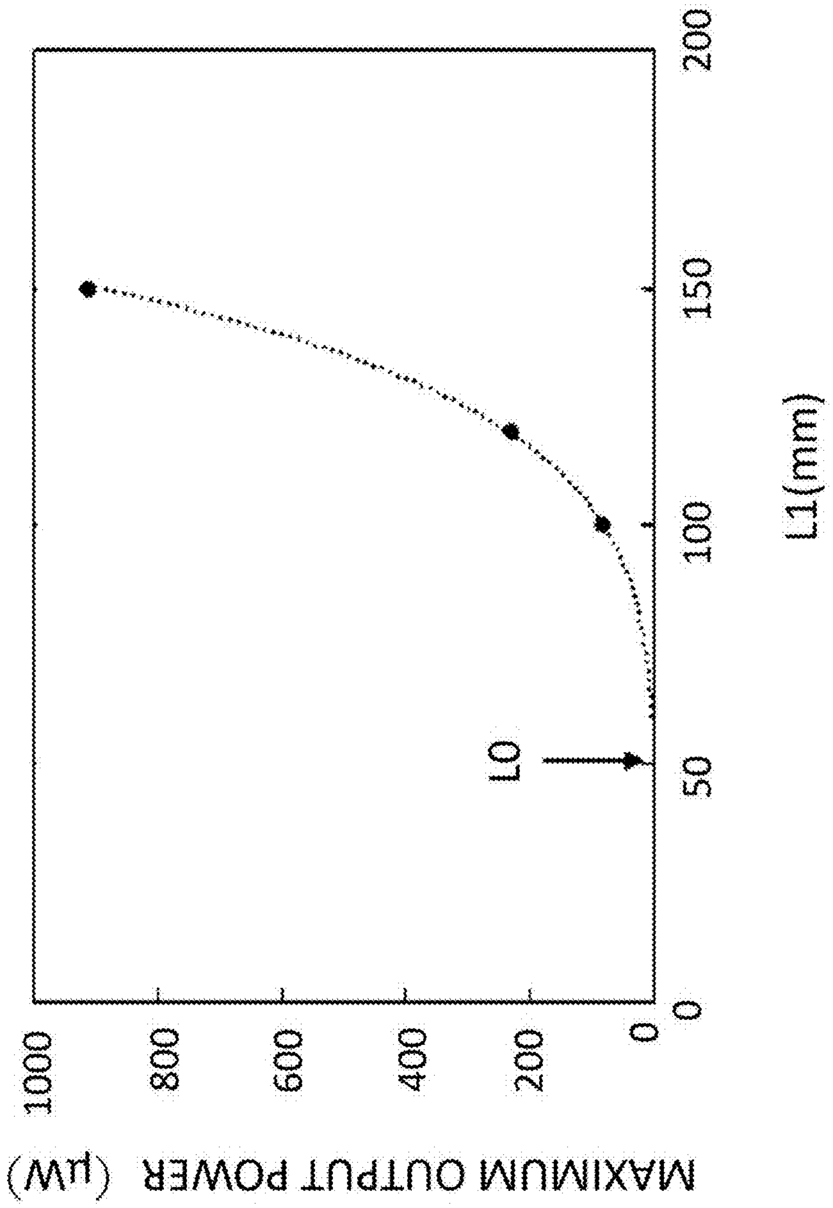
FIG. 14D is a graph showing the relationship between length of the elastic body and output power.
Figure 15A:
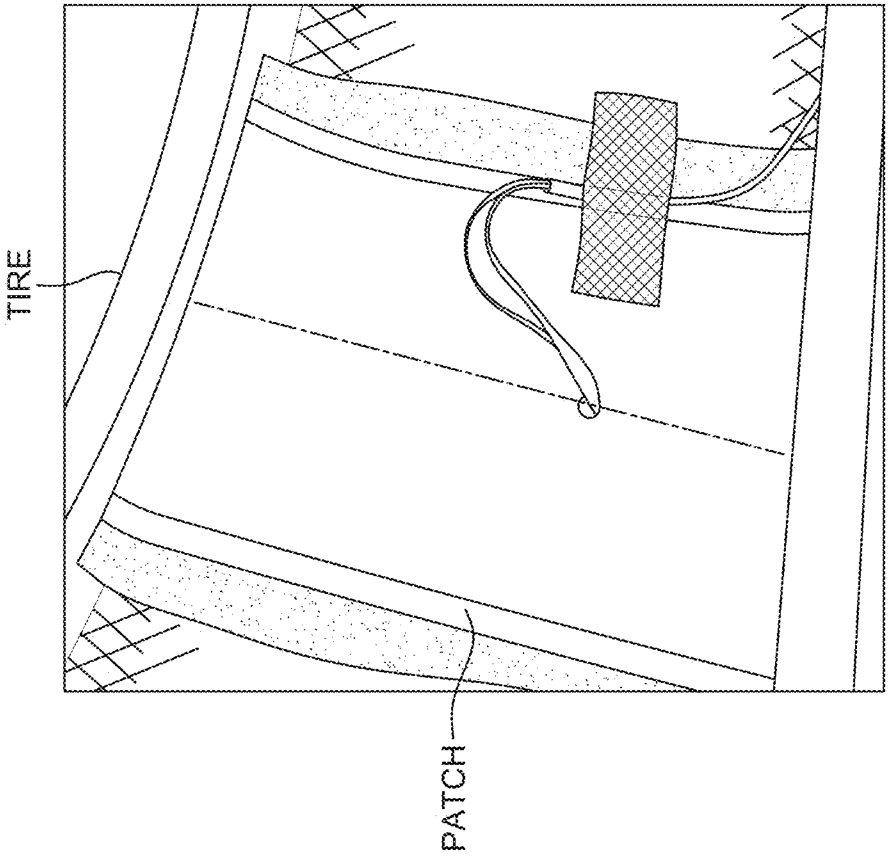
FIG. 15A is an image of a tire assembly according to working example 5.
Figure 15B:
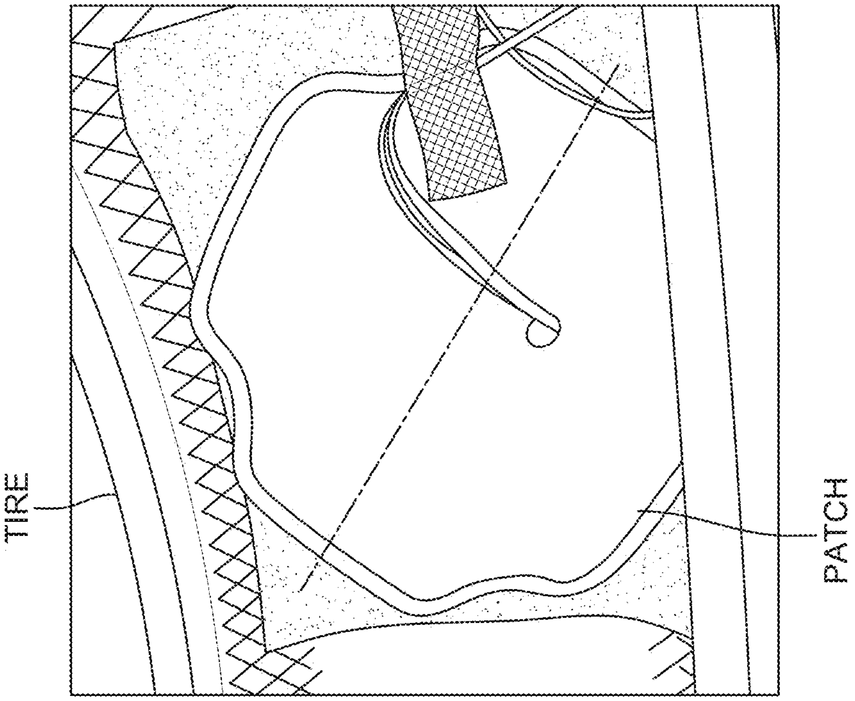
FIG. 15B is an image of a tire assembly according to working example 6.
Figure 15C:
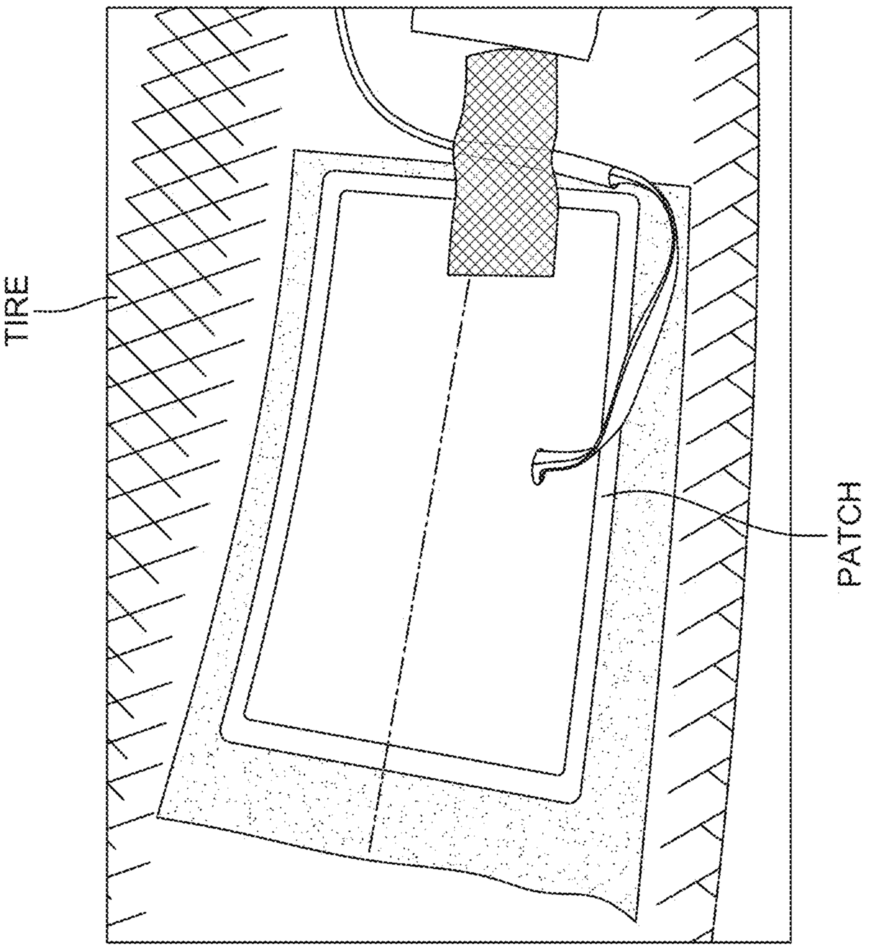
FIG. 15C is an image of a tire assembly according to working example 7.
Figure 15D:
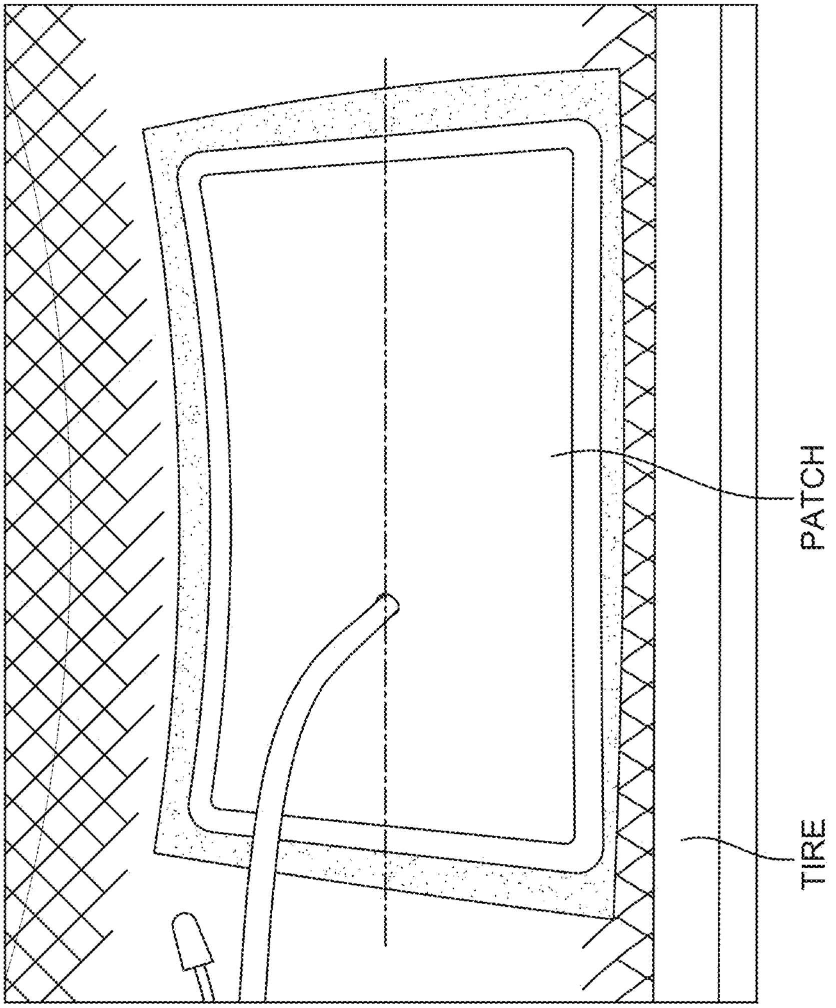
FIG. 15D is an image of a tire assembly according to working example 8.
Figure 15E:
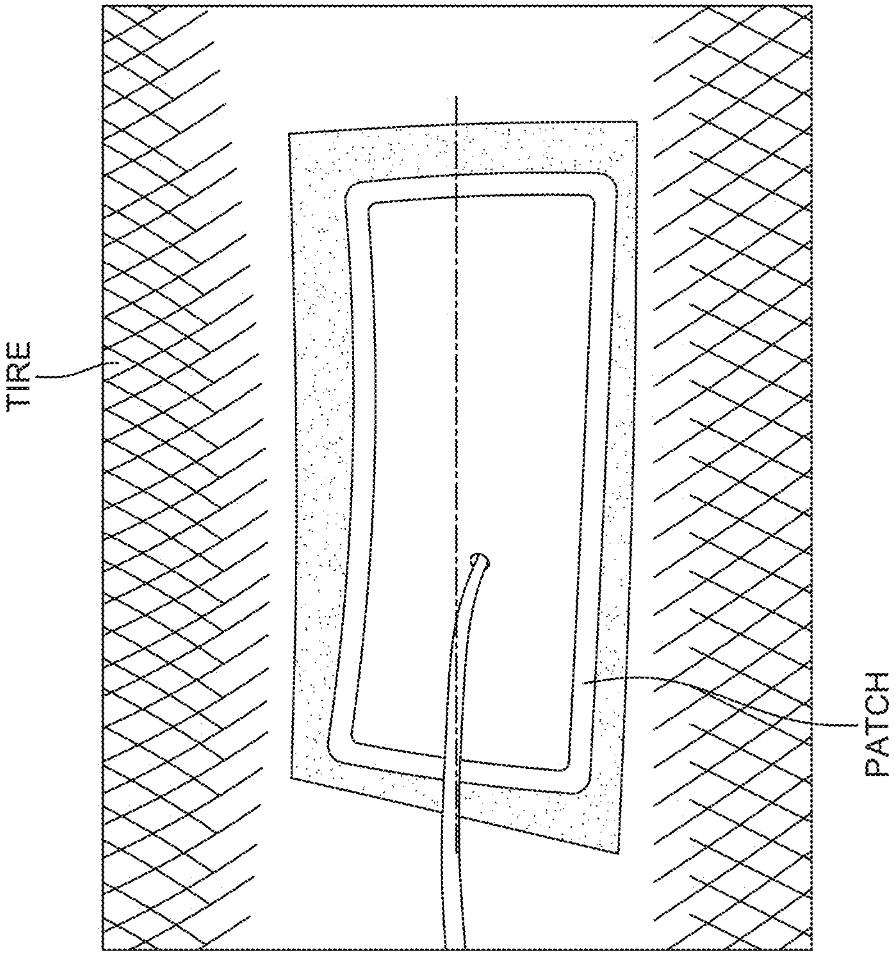
FIG. 15E is an image of a tire assembly according to working example 9.
Figure 15F:
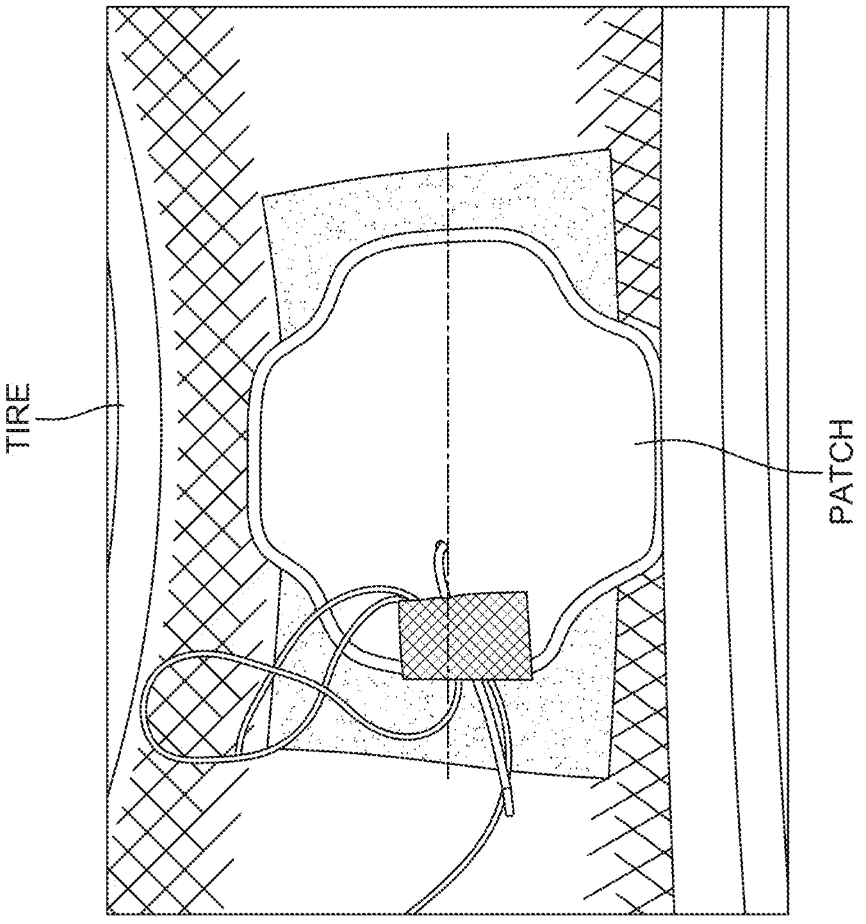
FIG. 15F is an image of a tire assembly according to working example 10.
Figure 16A:
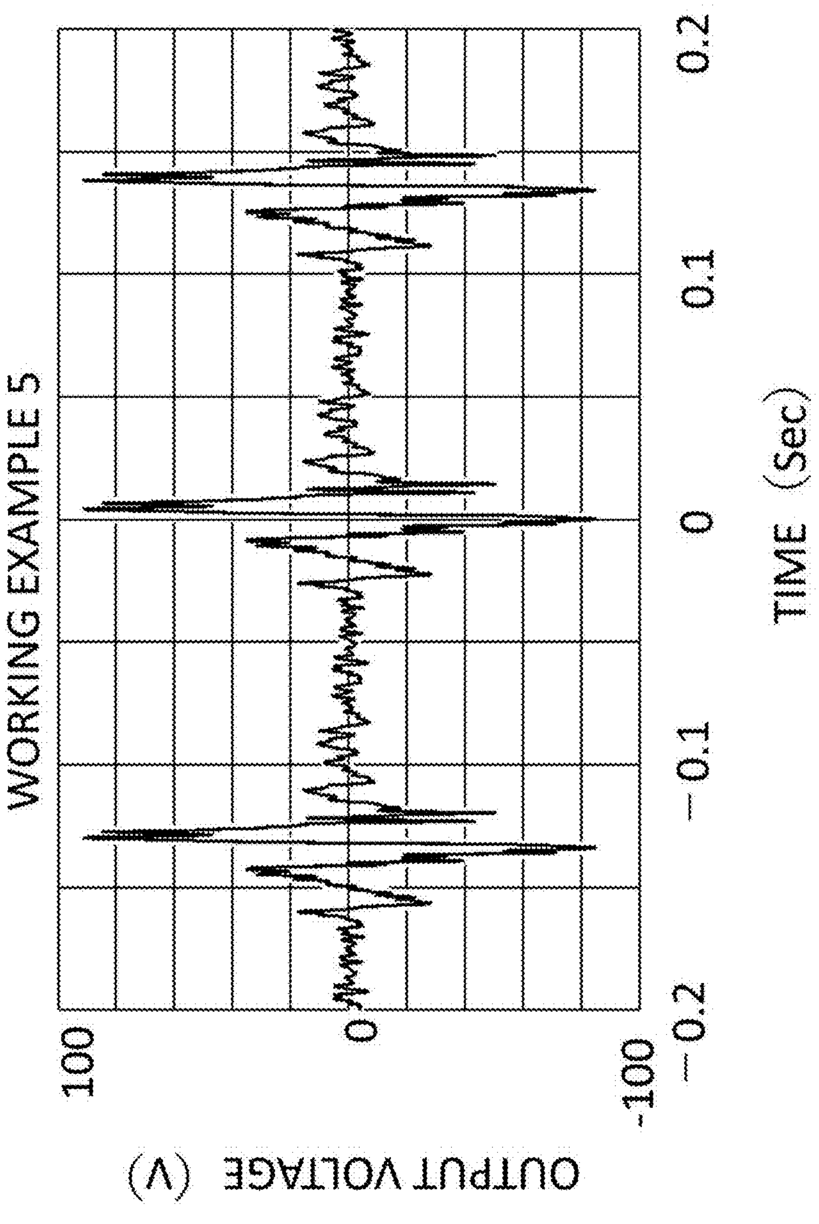
FIG. 16A is a graph of the output voltage of the tire assembly according to working example 5.
Figure 16B:
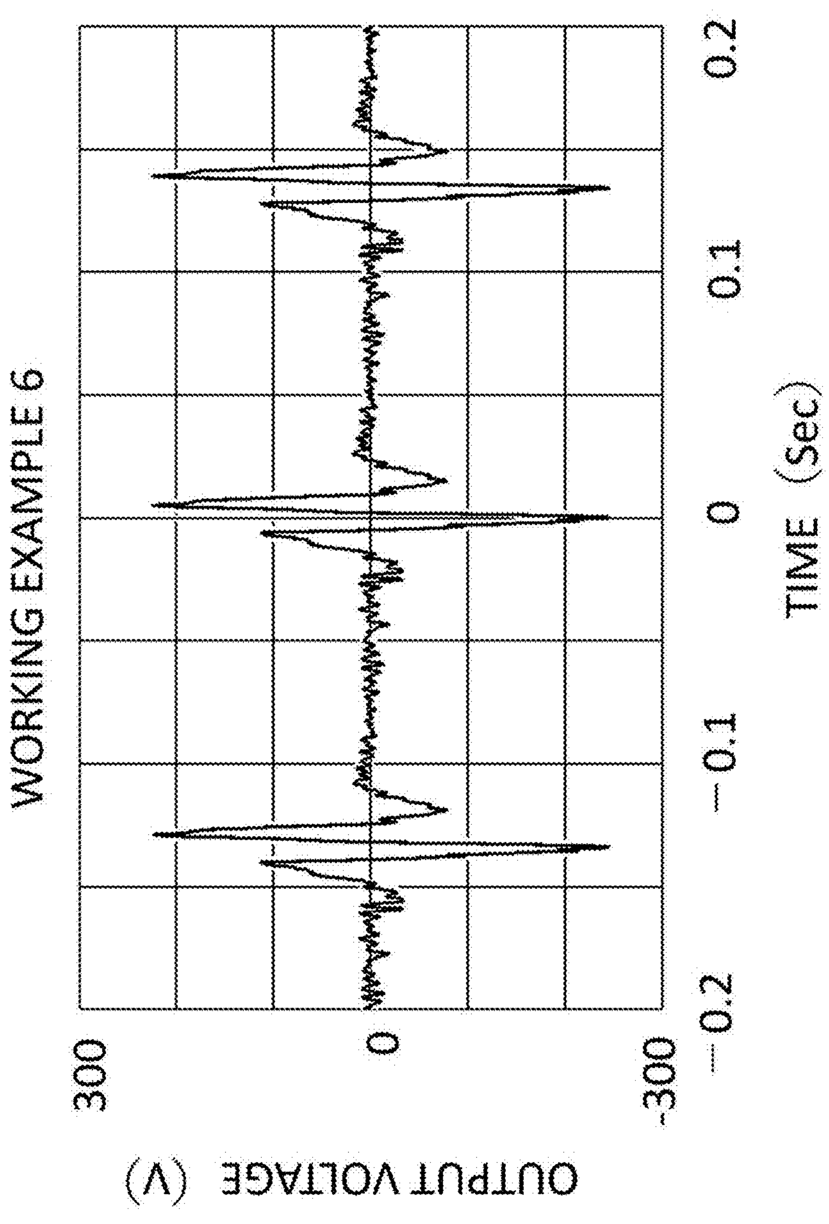
FIG. 16B is a graph of the output voltage of the tire assembly according to working example 6.
Figure 16C:
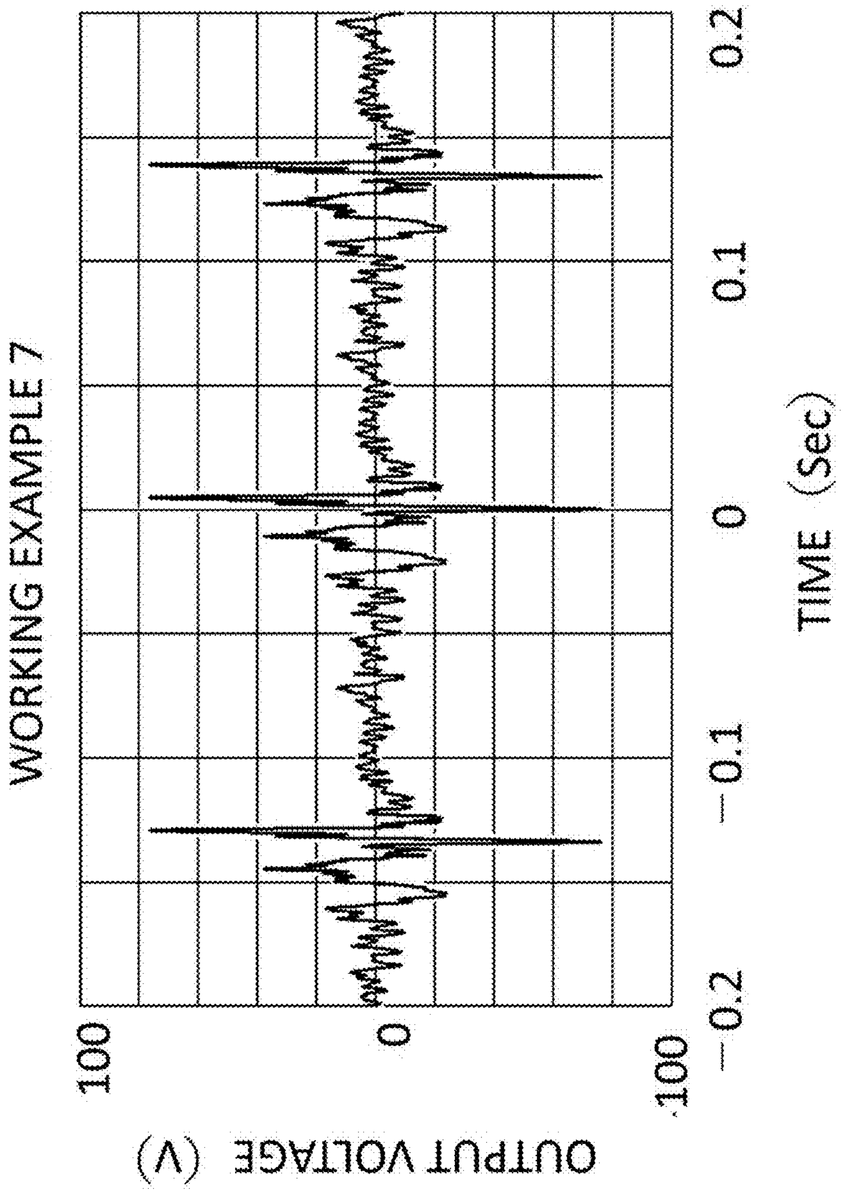
FIG. 16C is a graph of the output voltage of the tire assembly according to working example 7.
Figure 16D:
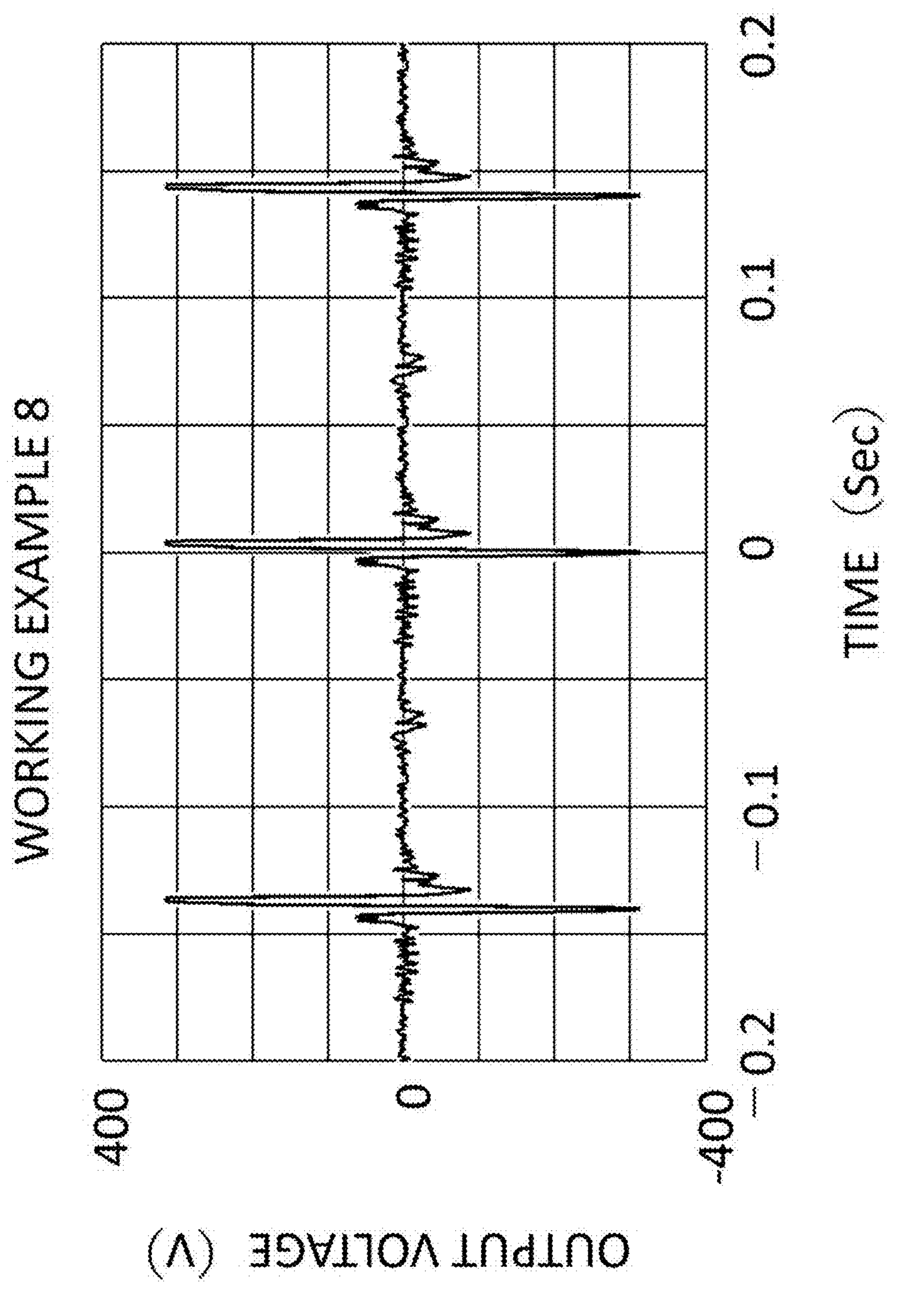
FIG. 16D is a graph of the output voltage of the tire assembly according to working example 8.
Figure 16E:
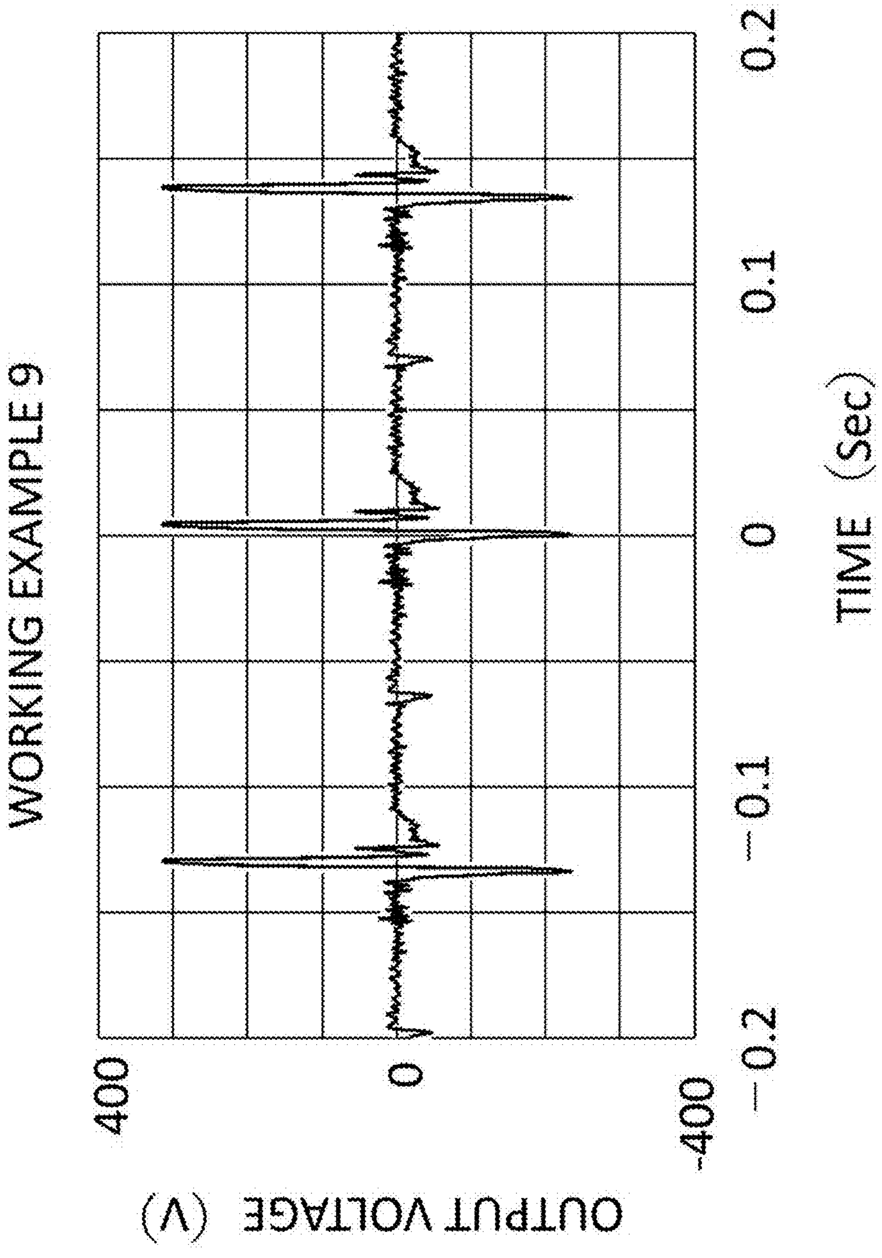
FIG. 16E is a graph of the output voltage of the tire assembly according to working example 9.
Figure 16F:
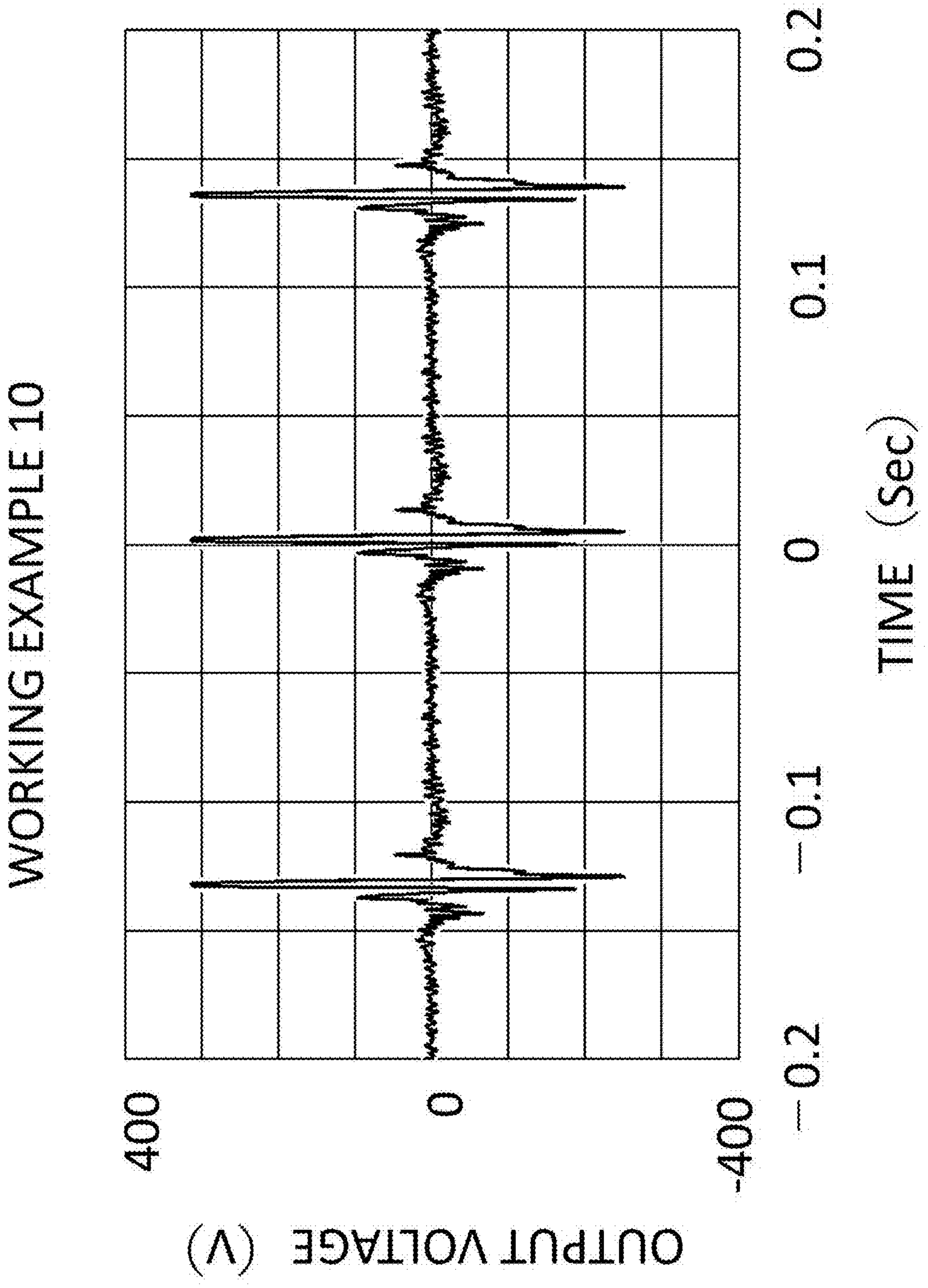
FIG. 16F is a graph of the output voltage of the tire assembly according to working example 10.

Graphs of the output voltage (V) of the power generation body 1A with respect to rotation time (Sec) are as respectively shown in FIGS. 14A to 14C. Note that, in FIGS. 14A to 14C, the scales of the vertical axes differ from each other, for the convenience of description. Note that FIG. 14A shows the results of similar tests to FIG. 13B, which are shown again for reference purposes. As can be seen from FIGS. 14A to 14C, the tire assemblies 7B, 7D and 7E according to working examples 2 to 4 all output comparatively high voltages and generated large amounts of power. FIG. 14D is a graph that plots test data with L1 on the horizontal axis and maximum output power (μW) on the vertical axis. As can be seen from FIG. 14D, when the materials, thicknesses and lengths L2 of the flexible bodies are the same, the maximum output power increased markedly as L1 became longer, and the maximum output power decreased as L1 approached L0.

The results of test 2 confirm that the power generation amount of the power generation body 1A improves as the length L1 of the elastic body increases relative to L0 and $L_c$.

Test 3

Tire assemblies sharing a common configuration with test 1, apart from using a cord member embedded in a commercially available tire repair patch (manufactured by Maruni Industry Co., Ltd.) as the elastic body and the sheet being omitted, were prepared as tire assemblies according to working examples 5 to 10. The patches had a base constituted mainly by an elastomer and a plurality of cord layers embedded inside the base and formed with reinforcing cord members. The reinforcing cord members included polyester cords, nylon cords, aramid cords, and steel cords. The patches were positioned such that the geometric centers thereof all match the geometric center of the power generation body, and were fixed to the inner surface of the tire using a dedicated vulcanization adhesive (Super Valkarn G manufactured by Maruni Industry Co., Ltd.), so as to cover the whole power generation body adhered to the inner surface of the tire.

FIGS. 15A to 15F are images showing how the patches according to working examples 5 to 10 were fixed to the inner surface of the tire. As can be seen from FIGS. 15A to 15F, rectangular patches and also square patches with the four corners cut off to form approximately octagonal shapes were used. Table 2 shows the model number of the patches according to the respective working examples, the orientation of the patches with respect to the circumferential direction of the tire, the shape and size of the patches, the size of the cord layer, and the number of cord layers. Here, the size of the cord layer is: longitudinal length of cord members constituting cord layer×width of plurality of cord members constituting cord layer. In the rectangular patches, the cord members extended in the same direction between the cord layers, and, in the approximately octagonal patches, the cord members extended at 90 degrees to each other between overlapping cord layers. Also, the "orientation" of the patches refers to the angle (00 to 90°) that a center line (shown by a dash-dotted line in FIGS. 15A to 15F) orthogonal to the pair of opposing sides that are furthest apart forms with the circumferential direction of the tire. As shown in Table 2, working examples 5 and 8 and working examples 6 and 10 respectively used the same patches that has been oriented differently on the inner surface of the tire. Tests were conducted with a similar method to test 1, using the tire assemblies according to working examples 5 to 10, and the output voltages of the power generation body were compared.

TABLE 2

| | Working Example 5 | Working Example 6 | Working Example 7 | Working Example 8 | Working Example 9 | Working Example 10 |
|---|---|---|---|---|---|---|
| Model no. | MR-40 | MB-05 | MR-20 | MR-40 | MR-22 | MB-05 |
| Orient. | 90° | 45° | 0° | 0° | 0° | 0° (90°) |
| Patch size, shape | 115 × 200 mm Rectangle | 165 × 165 mm Octagon (square without corners) | 85 × 135 mm Rectangle | 115 × 200 mm Rectangle | 80 × 180 mm Rectangle | 165 × 165 mm Octagon (square without corners) |
| Cord layer size | 105 × 70 mm | 80 × 80 mm | 70 × 50 mm | 105 × 70 mm | 115 × 45 mm | 80 × 80 mm |
| Cord layer number | 3 | 4 | 2 | 3 | 2 | 4 |

Test Results

Graphs of the output voltage (V) of the power generation body with respect to rotation time (Sec) are as respectively shown in FIGS. 16A to 16F. Note that, in FIGS. 16A to 16F, the scales of the vertical axes differ from each other, for convenience of description. In all of the working examples, the maximum output voltage was markedly higher than the reference example in test 1, confirming the effectiveness of using cord members as the elastic body.

REFERENCE SIGNS LIST

1, 1A Power generation body
6 Vehicle
7, 7A-7E Tire assembly
10 First member
20 Second member
50 Elastic body
60 Control device (external control device)
70 Tire
100 First surface
110 First insulating film
120 First electrode
130 First base
200 Second surface
210 Second insulating film
220 Second electrode
230 Second base

The invention claimed is:

1. A tire assembly comprising:
a tire for mounting on a vehicle;
an elastic body on an inner side of the tire; and
a power generation body between an inner surface of the tire and the elastic body,
wherein the power generation body includes:
a first member having a first insulating film forming a first surface; and
a second member having a second insulating film forming a second surface facing the first surface and contacting the first surface, the first member and the second member are configured such that a true contact area between the first surface and the second surface changes in response to pressure applied to the first member and the second member, and the first insulating film and the second insulating film are configured such that one of the films is positively charged and the other of the films is negatively charged due to the true contact area changing, wherein the elastic body biases the power generation body toward the inner surface of the tire, wherein the elastic body includes:

a base mainly formed from an elastomer; and a cord layer constituted by a plurality of cord members embedded in the base, wherein a peripheral portion of the base is fixed to the inner surface of the tire by adhesion, and wherein a length of each of the plurality of cord members along a circumferential direction of the tire is not less than a ground contact length of the tire.

2. The tire assembly according to claim 1, wherein the elastic body is disposed to cover the power generation body in the circumferential direction of the tire.

3. The tire assembly according to claim 1, wherein the power generation body is configured such that a length of the first surface along the circumferential direction of the tire is not greater than the ground contact length of the tire.

4. The tire assembly according to claim 1, wherein the power generation body is configured such that at least one of the first surface and the second surface has undulations.

5. The tire assembly according to claim 1, wherein the first member further has a first electrode disposed on a back surface of the first surface so as to contact the first insulating film, the second member further has a second electrode disposed on a back surface of the second surface so as to contact the second insulating film, and the first electrode and the second electrode are constituted by a material having flexibility.

6. The tire assembly according to claim 1, further comprising:

an electronic device configured to receive supply of power output from the power generation body.

7. The tire assembly according to claim 6, further comprising:

a storage battery configured to store power output by the power generation body, wherein the electronic device receives supply of power stored in the storage battery.

8. The tire assembly according to claim 6, wherein the electronic device includes a communication device configured to communicated data with an external device.

9. A tire monitoring system comprising:

the tire assembly according to claim 8; and an external control device configured to communicate data with the communication device, wherein the communication device transmits output data of at least one of a voltage and current output by the power generation body and a physical quantity based on at least one of the voltage and current to the external control device, and the external control device monitors information relating to the tire, based on the output data received from the communication device.

10. The tire monitoring system according to claim 9, wherein the information relating to the tire includes at least one of information relating to a rotation speed of the tire, information relating to wear of the tire, and information relating to a state of a road surface on which a vehicle on which the tire is mounted travels.

11. The tire monitoring system according to claim 9, wherein the external control device is installed in a vehicle that includes the tire assembly.

12. A tire monitoring method comprising:

preparing a vehicle on which the tire assembly according to claim 6 is mounted;

collecting output data of at least one a voltage and current output by the power generation body while the vehicle is travelling and a physical quantity based on at least one of the voltage and current; and monitoring information relating to the tire, based on the collected output data.

* * * * *